US012142836B2

(12) United States Patent
Hamza et al.

(10) Patent No.: US 12,142,836 B2
(45) Date of Patent: Nov. 12, 2024

(54) PLANAR TIGHTLY COUPLED ARRAYS AND ANTENNA ELEMENTS THEREOF

(71) Applicants: Muhammad Hamza, Miami, FL (US); Stavros Georgakopoulos, Miami, FL (US); Constantinos L. Zekios, Miami, FL (US)

(72) Inventors: Muhammad Hamza, Miami, FL (US); Stavros Georgakopoulos, Miami, FL (US); Constantinos L. Zekios, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 18/315,006

(22) Filed: May 10, 2023

(65) Prior Publication Data

US 2024/0213688 A1 Jun. 27, 2024

Related U.S. Application Data

(60) Provisional application No. 63/364,464, filed on May 10, 2022.

(51) Int. Cl.
*H01Q 21/06* (2006.01)
*H01Q 1/40* (2006.01)
(Continued)

(52) U.S. Cl.
CPC ........... *H01Q 21/061* (2013.01); *H01Q 1/405* (2013.01); *H01Q 5/25* (2015.01); *H01Q 9/42* (2013.01); *H01Q 21/0006* (2013.01)

(58) Field of Classification Search
CPC ...... H01Q 9/26; H01Q 1/2283; H01Q 21/062; H01Q 21/061; H01Q 5/25
See application file for complete search history.

(56) References Cited

U.S. PATENT DOCUMENTS 7,109,940 B1 * 9/2006 Volman ................ H01Q 21/067 343/785
9,276,554 B2 * 3/2016 Lynch ...................... H03H 7/52
(Continued)

FOREIGN PATENT DOCUMENTS

CN 116565557 A * 8/2023
CN 116666974 A * 8/2023
(Continued)

OTHER PUBLICATIONS

Yang et al. "Fully-Planar Ultrawideband Tightly-Coupled Array (FPU-TCA) With Integrated Feed for Wide-Scanning Millimeter-Wave Applications". IEEE Transactions on Antennas and Propagation ( vol. 68, Issue: 9, Sep. 2020) (Year: 2020).*
(Continued)

*Primary Examiner* — Ricardo I Magallanes
(74) *Attorney, Agent, or Firm* — SALIWANCHIK, LLOYD & EISENSCHENK

(57) ABSTRACT

Ultra-wideband (UWB) arrays that are fully planar are provided. Fully-planar inverted-L element (FILE) arrays that are tightly coupled arrays (TCAs) can realize UWB tightly coupled apertures in the W and higher millimeter wave (mmWave) bands. The unit cell architecture of the FILE array, (which can have any desired size, can be comprised of an inverted-L shaped antenna and a capacitively coupled via-fence.

2 Claims, 19 Drawing Sheets

(51) Int. Cl.

| | |
|---|---|
| ***H01Q 5/25*** | (2015.01) |
| ***H01Q 9/42*** | (2006.01) |
| ***H01Q 21/00*** | (2006.01) |

(56) References Cited

U.S. PATENT DOCUMENTS

2022/0209387 A1* 6/2022 Steward ............... H01Q 1/2283
2022/0399643 A1* 12/2022 Gimeno Martín ....... H01Q 1/28
2024/0055776 A1* 2/2024 He ..................... H01Q 21/0075

FOREIGN PATENT DOCUMENTS

CN 117080758 A * 11/2023
WO WO-2021078654 A1 * 4/2021 ............. H01Q 1/523
WO WO-2022111965 A1 * 6/2022 ............... H01Q 1/36
WO WO-2024037129 A1 * 2/2024

OTHER PUBLICATIONS

J. A. Kasemodel, C.-C. Chen and J. L. Volakis, "Wideband Planar Array With Integrated Feed and Matching Network for Wide-Angle Scanning," in IEEE Transactions on Antennas and Propagation, vol. 61, No. 9, pp. 4528-4537, Sep. 2013. (Year: 2013).*

Hamza et al. "An Ultra-Wideband Fully-Planar Inverted-L Monopole (FILM) Array". 2022 IEEE International Symposium on Phased Array Systems & Technology (PAST) (Year: 2022).*

Nocak et al. "Ultra-Wideband Phased Array for Millimeter-Wave ISM and 5G Bands, Realized in PCB". IEEE Transactions on Antennas and Propagation, vol. 66, No. 12, Dec. 2018 (Year: 2018).*

Zhou et al. "Tightly Coupled Array Antennas for Ultra-Wideband Wireless Systems" in IEEE Access, vol. 6, pp. 61851-61866, Oct. 4, 2018. (Year: 2018).*

* cited by examiner

PLANAR TIGHTLY COUPLED ARRAYS AND ANTENNA ELEMENTS THEREOF

CROSS-REFERENCE TO RELATED APPLICATION

This application claims the benefit of U.S. Provisional Application Ser. No. 63/364,464, filed May 10, 2022, the disclosure of which is hereby incorporated by reference in its entirety, including all figures, tables, and drawings.

GOVERNMENT SUPPORT

This invention was made with government support under FA9550-18-1-0191 awarded by the Air Force Office of Scientific Research. The government has certain rights in the invention.

BACKGROUND

Next generation communication systems will rely on ultra-wideband (UWB) millimeter wave (mmWaves) platforms to provide traffic capacities of 1 gigabit per second per square meter (Gbps/$m^2$) and peak data rates of greater than 1 terabit per second (1 Tbps) with connectivity of up to 107 devices per square kilometer (devices/$km^2$) and greater link reliability of up to 99.99999%. However, the challenge of electromagnetic propagation at these frequencies, due to free-space pathloss, atmospheric absorption, and scattering (among other factors), need to be addressed.

BRIEF SUMMARY

Embodiments of the subject invention provide ultra-wideband (UWB) arrays that are fully planar, as well as methods of fabricating the same and methods of using the same. Fully-planar inverted-L element (FILE) arrays can be tightly coupled arrays (TCAs) (e.g., tightly coupled dipole arrays (TCDAs) or tightly coupled monopole arrays (TC-MAs)). The FILE array provides a unique solution to realize UWB tightly coupled apertures in the W and higher millimeter wave (mmWave) bands. The unit cell architecture of this array (which can have any desired size) is comprised of an inverted-L shaped (or T-shaped) antenna element (e.g., a monopole or a dipole), and a capacitively coupled via-fence.

In an embodiment, an antenna element (e.g., a single unit cell antenna element) can comprise: a ground plane; a first grounded via disposed on the ground plane; a second grounded via physically separated from the first grounded via and disposed on the ground plane; a via fence electrically connected to the first grounded via and the second grounded via; and a bent antenna (e.g., a bent monopole) comprising an antenna conductive line (e.g., an antenna microstrip line) extending parallel to the ground plane and a feed via electrically connected to the antenna conductive line and extending down through the ground plane. The via fence can comprise a first fence conductive line (e.g., a first fence microstrip line) disposed parallel to the ground plane along a first side of a perimeter of the antenna element and a second fence conductive line (e.g., a second fence microstrip line) disposed parallel to the ground plane along a second side of the perimeter of the antenna element, the second side being opposite to the first side. The ground plane can comprise a hole through which the feed via passes. The antenna conductive line can comprise a central element in physical contact with the feed via, a distal element disposed at the first side of the perimeter of the antenna element, and an arm element connecting the central element to the distal element. A cross-section of the central element (taken in a first plane parallel to the ground plane) can have a circular or annular shape, a cross-section of the distal element (taken in the first plane) can have a semicircular shape, and a cross-section of the arm element (taken in the first plane) can have a rectangular shape, though embodiments are not limited thereto. The antenna element can further comprise: a first substrate disposed on the ground plane and through which the first grounded via, the second grounded via, and the feed via extend; and/or a second substrate disposed on the first substrate and through which the feed via extends. The antenna element can further comprise a superstrate (e.g., a dielectric superstrate) disposed on the second substrate, such that the second substrate is disposed between the first substrate and the superstrate. The antenna element can be free from any balun and/or any electrical connection to any balun (i.e., no balun is present in the antenna element and/or no electrical connection to any balun is present in the antenna element). The first fence conductive line can be physically connected to the first grounded via, and/or the second fence conductive line can be physically connected to the second grounded via. The bent antenna can be the only antenna present in the antenna element (i.e., no other antenna element can be present in a unit cell of the antenna element). The first fence conductive line can extend in a direction parallel to that of the second fence conductive line and perpendicular to that of the antenna conductive line. The first grounded via can be disposed at the first side of the perimeter of the antenna element, and/or the first grounded via can be capacitively coupled to the antenna conductive line.

In another embodiment, a UWB array (e.g., a UWB TCA) can comprise a plurality of unit cell antenna elements, and each unit cell antenna element of the plurality of unit cell antenna elements can be an antenna element having any combination of the features discussed in the previous paragraph. The UWB array can comprise a single ground plane that functions as the ground plane of each unit cell antenna element of the plurality of unit cell antenna elements. The UWB array can be free from any balun and/or any electrical connection to any balun (i.e., no balun is present in the UWB array and/or no electrical connection to any balun is present in the UWB array). The UWB array can cover a frequency bandwidth of, for example, in a range of from 1f to 3.06f, with f being a lowest frequency of operation of the UWB array. The lowest frequency of operation (f) can be, for example, at least 15 gigahertz (GHz) (e.g., at least 20 GHZ, at least 25 GHZ, at least 30 GHz, at least 33 GHZ, at least 35 GHZ, at least 40 GHz, at least 50 GHz, at least 60 GHz, at least 70 GHz, at least 80 GHz, at least 90 GHz, at least 100 GHz). The overall frequency of operation can be, for example, within a range of from 15 GHz to 101 GHZ, or any subrange therewithin (for example, from 33 GHz to 101 GHz)). The UWB array can have an extremely low profile, with a maximum thickness of, for example, 0.4λH (where λ is the wavelength that corresponds to the frequency of operation of the array, and H is the width of a unit cell antenna element). The UWB array can have a voltage standing wave ratio (VSWR) of less than 3 for a maximum scan-angle (θ) of +/−45° for all principal planes (i.e., E-, H- and D-planes). The UWB array is a tightly coupled array according to the meaning of the term "tightly coupled" understood in the art, which is discussed in more detail in the Detailed Description section herein (the unit cell antenna elements are disposed extremely close to each other).

BRIEF DESCRIPTION OF DRAWINGS

FIG. 2(*b*) shows an isometric view of an inverted-L shaped (or T-shaped) antenna element, which includes a traditional monopole element with a microstrip line parallel to the ground plane.

FIG. 2(*c*) shows an isometric view of an inverted-L shaped antenna element with a capacitively coupled grounded via.

FIG. 2(*d*) shows an isometric view of a fully-planar inverted-L element (FILE) with two capacitively coupled grounded vias (one at each side), according to an embodiment of the subject invention.

FIG. 2(*e*) shows an E-plane radiation pattern for the traditional monopole element shown in FIG. 2(*a*) at a frequency of 80 gigahertz (GHz).

FIG. 2(*f*) shows a plot of voltage standing wave ratio (VSWR) versus frequency (in GHz) for the elements of FIGS. 2(*a*)-2(*d*). The legend in FIG. 2(*f*) lists "Step 1", "Step 2", "Step 3", and "Step 4", and these correspond to the curves for the elements shown in FIG. 2(*a*), FIG. 2(*b*), FIG. 2(*c*), and FIG. 2(*d*), respectively. The (black) curve with the highest VSWR value at 65 GHz is for the element shown in FIG. 2(*c*); the (red) curve with the second-highest VSWR value at 65 GHz is for the element shown in FIG. 2(*a*); the (blue) curve with the third-highest VSWR value at 65 GHz is for the element shown in FIG. 2(*b*); and the (green) curve with the lowest VSWR value at 65 GHz is for the element shown in FIG. 2(*d*).

FIG. 2(*g*) shows an E-plane radiation pattern for the inverted-L element shown in FIG. (d) at a frequency of 80 GHz.

FIG. 3(*a*) shows an isometric view of the unit cell;

FIG. 3(*b*) shows a top view; FIG. 3(*c*) shows a trimetric view; FIG. 3(*d*) shows a dimetric view; FIG. 3(*e*) shows a top view; FIG. 3(*f*) shows a bottom view; FIG. 3(*g*) shows a cross-sectional view, looking from the bottom upwards in the view of FIG. 3(*c*); FIG. 3(*h*) shows a cross-sectional view, looking from the left to the right in the view of FIG. 3(*e*); and FIG. 3(*i*) shows an exploded view.

FIG. 6(*b*) shows a plot of gain (in dB) versus frequency (in GHz) for a 16×16 FILM array, with $\theta=45°$. The unshaded region represents a desired frequency band of operation from 33 GHz to 101 GHz. The (black) curve with the highest gain value at 115 GHz is for the ideal gain; the (green) curve with the second-highest gain value at 115 GHz is for the simulated H-plane gain; the (blue) curve with the third-highest gain value at 115 GHz is for the simulated D-plane gain; and the (red) curve with the lowest gain value at 115 GHz is for the simulated E-plane gain.

FIG. 7(*b*) shows a top view of an enlarged 4×4 section from the 16×16 FILE array of FIG. 7(*a*).

FIG. 8(*b*) shows a plot of gain (in dB) versus frequency (in GHz) for a 16×16 FILE array, with $\varphi=90°$. The (black) solid curve with the highest gain value at 90 GHz is for the ideal gain at $\theta=0°$; the (black) dashed curve with the second-highest gain value at 90 GHz is for the expected gain at $\theta=0°$; the (green) solid curve with the third-highest gain value at 90 GHz is for the ideal gain at $\theta=45°$; and the (green) dashed curve with the lowest gain value at 90 GHz is for the expected gain at $\theta=45°$.

FIG. 8(*c*) shows a plot of gain (in dB) versus frequency (in GHz) for a 16×16 FILE array, with $\varphi=45°$. The (black) solid curve with the highest gain value at 90 GHz is for the ideal gain at $\theta=0°$; the (black) dashed curve with the second-highest gain value at 90 GHz is for the expected gain at $\theta=0°$; the (blue) solid curve with the third-highest gain value at 90 GHz is for the ideal gain at $\theta=45°$; and the (blue) dashed curve with the lowest gain value at 90 GHz is for the expected gain at $\theta=45°$.

DETAILED DESCRIPTION

Figure 1:
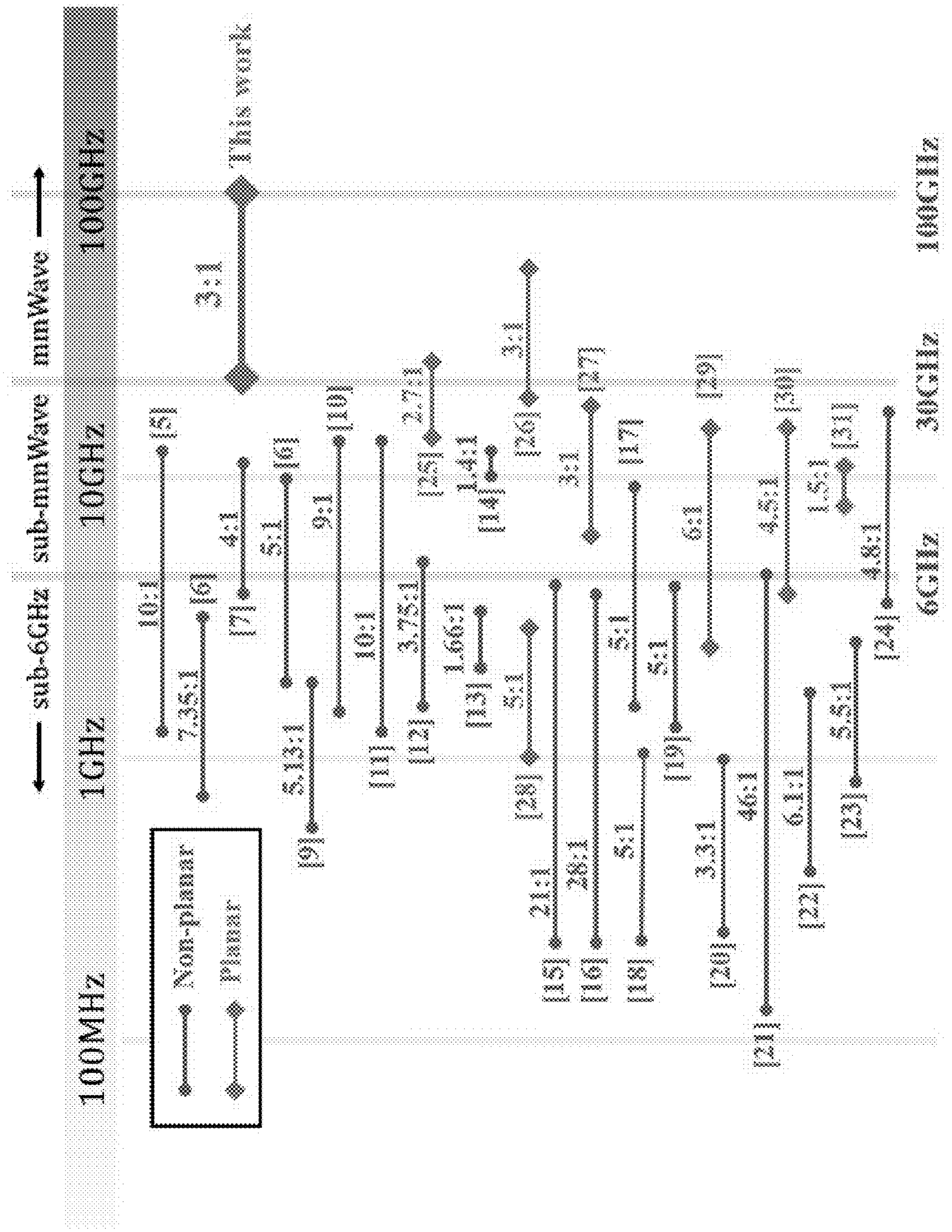
FIG. 1 shows a visualization of planar and non-planar ultra-wideband (UWB) antenna arrays arranged based on their frequency band of operation. The numbers in brackets are for related art arrays. The label "This work" is for arrays of embodiments of the subject invention.

Embodiments of the subject invention provide ultra-wideband (UWB) arrays that are fully planar, as well as methods of fabricating the same and methods of using the same. Fully-planar inverted-L element (FILE) arrays can be tightly coupled arrays (TCAs) (e.g., tightly coupled dipole arrays (TCDAs) or tightly coupled monopole arrays (TCMAs)). The FILE array provides a unique solution to realize UWB tightly coupled apertures in the W and higher millimeter wave (mmWave) bands. The unit cell architecture of the FILE array (which can have any desired size) comprising an inverted-L shaped (or T-shaped) antenna element (e.g., a monopole or a dipole), and a capacitively coupled via-fence. This design eliminates the well-known broadside null from the radiation pattern of the traditional monopole element, and pushes both the common mode resonance, and the detrimental loop mode resonance, out of the band. In order to improve the impedance bandwidth and scanning ability, a dielectric-based superstrate can also be used. The array can have an extremely low profile, with a maximum thickness of, for example, 0.42H (where λ is the wavelength that corresponds to the frequency of operation of the array, and H is the width of a unit cell). The arrays can have a bandwidth of, for example, 3:1 (33 gigahertz (GHz) to 101 GHZ) with a voltage standing wave ratio (VSWR) of less than 3 for a maximum scan-angle (θ) of +/−45° for all principal planes (i.e., E-, H- and D-planes).

Arrays of embodiments of the subject invention can be tightly coupled arrays. The term "tightly coupled", when referring to antenna arrays, has an understood meaning in the art. The term "tightly coupled" was introduced in Munk (Finite Antenna Arrays and FSS, New York, Wiley. 2003; which is hereby incorporated by reference herein in its entirety) and refers to the case where the radiating elements (e.g., dipoles) of an antenna array are placed to an infinitesimally small distance to each other. In traditional antenna arrays, the antenna elements are placed at distance $d=\lambda/2$, where λ is the wavelength that corresponds to the frequency of operation of the array. In tightly coupled arrays the elements are placed at a distance $d \ll \lambda/2$ (i.e., d is much, much less than λ/2; for example, d is $\leq 0.1\lambda$, $0.01\lambda$, or $0.001\lambda$). Traditional implementations of tightly coupled arrays have their elements either directly connected with capacitors that are soldered between the antenna elements, or capacitively coupled, where the corresponding elements have a physical overlap, creating an equivalent capacitance.

UWB phased array systems, with their high-gain and fast electronic beam steering capability, are a viable solution to address the challenges at millimeter wave (mmWave) frequencies discussed in the Background section. In order to meet the performance metrics discussed in the Background section, and to enable future applications (e.g., tactile internet, vehicle-to-vehicle communication, augmented-reality, virtual-reality (AR/VR)), improved UWB arrays that operate over 30 GHz are urgently needed.

UWB arrays can be categorized in two different architectures, i.e., non-planar and planar architectures. In the non-planar architecture, printed circuit boards (PCBs) are vertically arranged and aligned adjacent to each other to form the array. This assembly procedure is usually implemented manually and is, therefore, prone to human error and misalignment issues. This is one of the main reasons why UWB vertical architectures are limited in terms of operation to lower frequencies (e.g., frequencies below 30 GHZ).

In planar architectures, the arrays are fabricated as a simple multi-layer PCB with plated vias. This can be achieved by using a standard multi-layer fabrication process with very high accuracy (up to 75 micrometers (μm)). This process requires minimal touch labor and, therefore, significantly reduces human error and misalignment issues. Thus, fully-planar topologies are desirable for operation at higher frequencies. Planar radiating elements include the planar ultra-wideband modular array (PUMA) element and other planar dipole-based elements with integrated baluns, which have scaled to significantly higher frequencies compared to non-planar designs. FIG. 1 presents non-planar (shown with lines ended on a circle) and planar (shown with lines ended on a rhombus) UWB antenna arrays in a chart, arranged based on their frequency band of operation. Referring to FIG. 1, even though planar architectures are indeed favorable for operation at higher microwave frequencies, most designs do not operate in mmWave frequencies (only the one labeled [26], which operates in the 24-72 GHz band). Thus, it is extremely challenging, even for planar designs, to scale to higher mm Wave frequencies. The main reason for this limitation is because at higher mmWave frequencies the unit-cell size shrinks, and therefore, the fabrication process for the design traces and plated-vias has many physical constraints (e.g., the minimum possible slot-width, trace-width, via-diameter, via spacing, etc.) that can be realized. It thus becomes extremely challenging to fit the required number of design components (traces, slots, vias, etc.,) in a single unit-cell.

One way to potentially scale these arrays to higher frequencies (beyond V-band), while using the standard PCB fabrication technique, is by simplifying the unit cells. This means to minimize the number of feed components (i.e., microstrip lines, baluns, etc.), radiating elements, and vias that are used to form a unit cell. Notably, elements can also be scaled to higher frequencies by utilizing different fabrication techniques (e.g., low-temperature co-fired ceramic (LTCC) fabrication, etc.). However, these techniques are significantly more expensive, and cannot provide a cost-effective solution for the massive production of mmWave phased arrays that is required. All related art planar designs require at least two vias for feeding purposes.

Embodiments of the subject invention provide a simpler element, compared to the traditional dipole element and its accompanied components (e.g., matching networks, vias, etc.), for planar UWB arrays, that can easily scale to mmWave frequencies. The utilization of a monopole element, instead of the traditional dipole element, can significantly reduce the complexity of the unit cell, and therefore, provide UWB arrays at high mmWave frequencies (e.g., frequencies beyond 70 GHZ) that are not realizable in the related art. The monopole element requires only one via for feeding purposes, compared to a dipole element that needs at least two vias. This reduction of a via can provide extra space that can be used to place additional vias needed to eliminate the well-known resonances (common-mode and loop-mode resonances) that appear in these UWB arrays. Also, the two arms of the dipole can be potentially replaced with just one (or no) arm of a monopole element. This increases significantly the "free" space of the unit cell, and removes the requirements for designing narrow slots/gaps needed between: (a) the dipole arms of the same unit-cell; and (b) the dipole arms of the adjacent unit cells. Notably, these slots/gaps are one of the limiting factors in fabrication at higher mmWave frequencies. In addition, the monopole element can be fed using an unbalanced feed, contrary to traditional dipoles, which removes the requirement of external or integrated baluns/cable-organizers, and significantly reduces the design complexity.

Even though replacing the dipole element in UWB arrays with a monopole element has many advantages, as it can significantly reduce the design complexity, and possibly scale these arrays to high mmWave frequencies, it is definitely not a trivial solution. This is because a traditional monopole element is characterized by a null in the broadside direction that hinders its use for broadside operating arrays. Moreover, the performance of monopoles in a tightly coupled array lattice does not exist in the related art, and no proposed solution exists in the related art (to the knowledge of the inventors) for eliminating the broadside null in monopole arrays. Here, going against the norm, this challenge is addressed, and embodiments of the subject invention provide the first TCA (e.g., TCMA or TCDA) that can operate in the broadside direction and scan down to ±45° in all principal planes for frequencies as high as 100 GHz or more.

Embodiments of the subject invention fill the gap in the related art by providing a new class of UWB arrays, the first TCA that can operate at frequencies above 10 GHZ. Embodiments provide a new FILE element for UWB arrays. The inverted-L element successfully eliminates the broadside null from the radiation pattern of the traditional monopole antenna, and can be fed using an unbalanced feed. Due to the minimum number of radiators used, and the reduced number of vias required, the inverted-L element paves the way to extend the frequency of tightly coupled UWB arrays up to W-band and higher. The FILE array is the first realizable tightly coupled array (TCA) that operates in the V-band and the W-band (from 33 GHZ to 101 GHZ), and it does so with 3:1 bandwidth. The array demonstrates a good scanning ability with a voltage standing wave ratio (VSWR) of less than 3 for a maximum scan angle of $\theta=+/-45°$ in all principal planes.

Figures 2A, 2B, 2C, 2D, 2E, 2F, 2G:
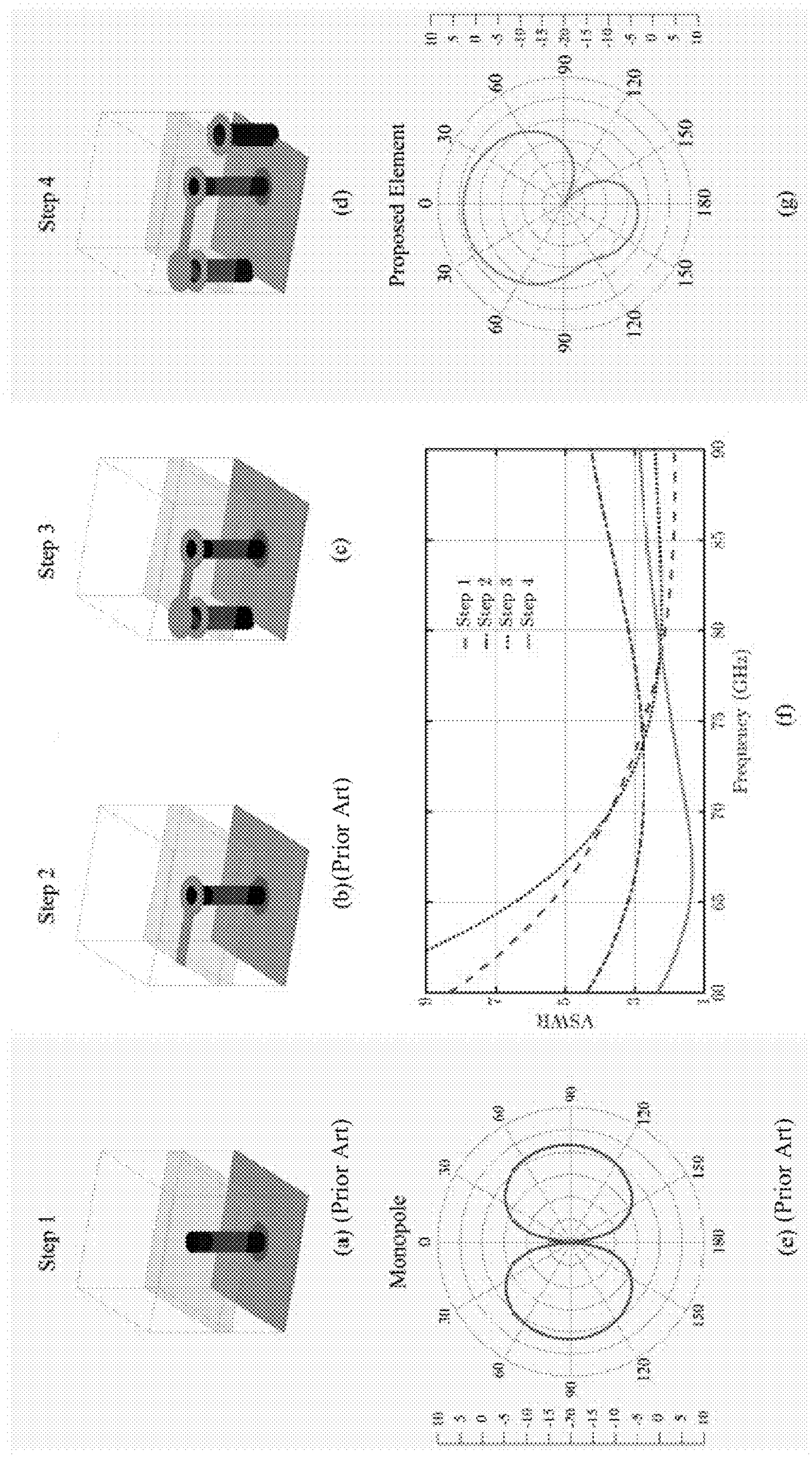
FIG. 2(*a*) shows an isometric view of a traditional monopole antenna element.
Figures 3A, 3B:
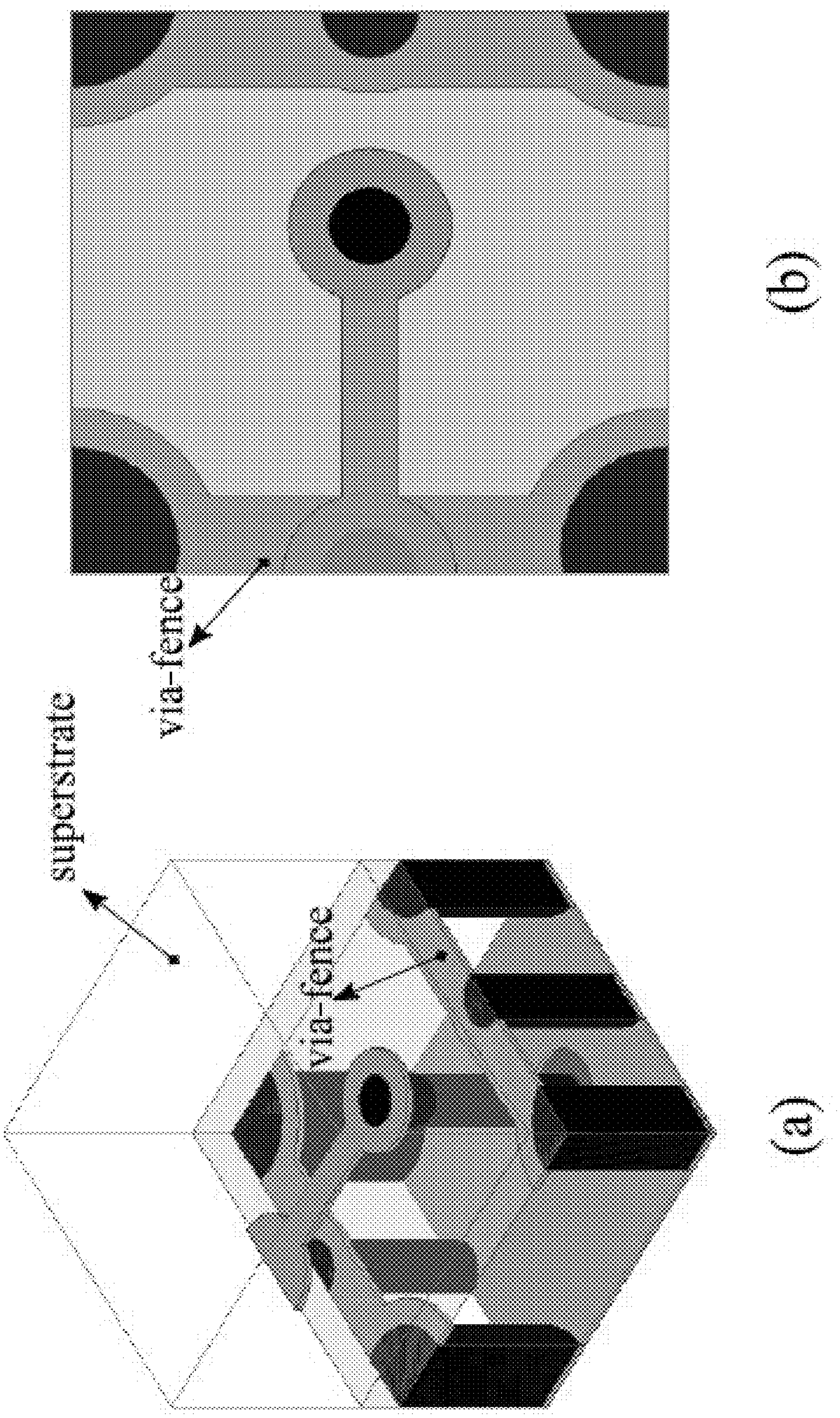
FIGS. 3(*a*)-3(*i*) show views of a unit cell of an inverted-L element, according to an embodiment of the subject invention.
Figure 3C:
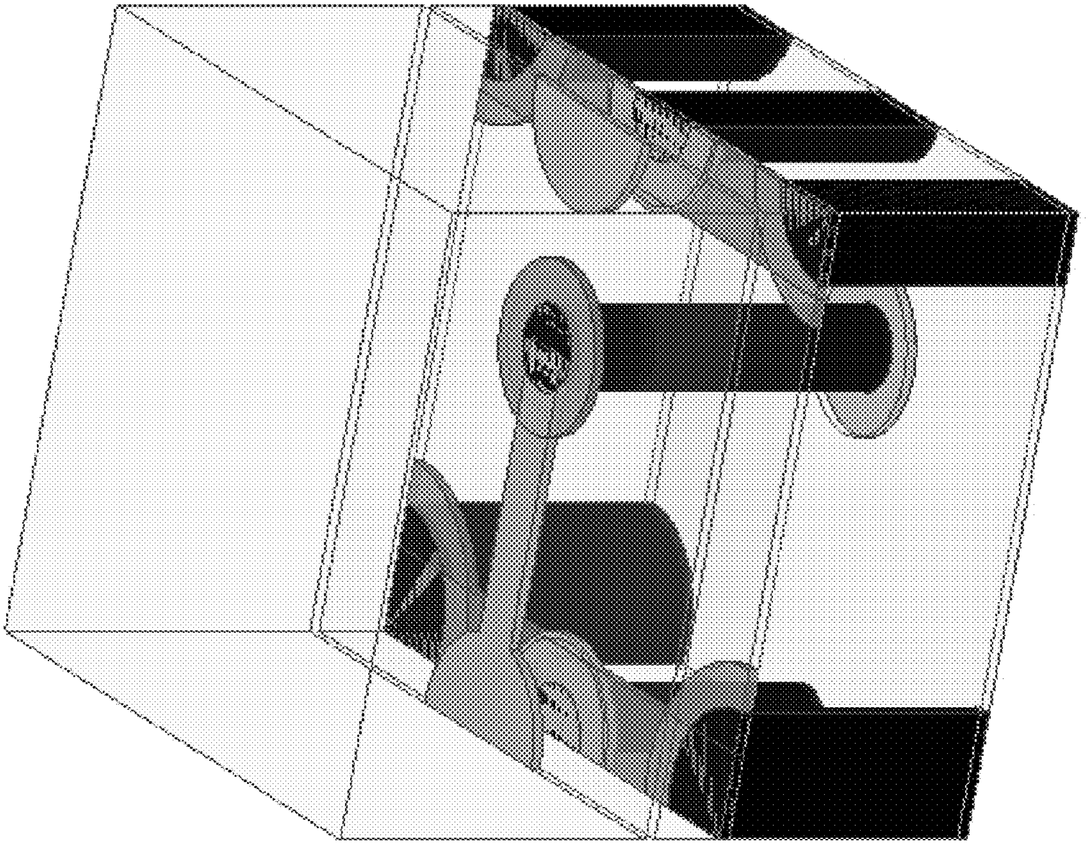
Figure 3D:
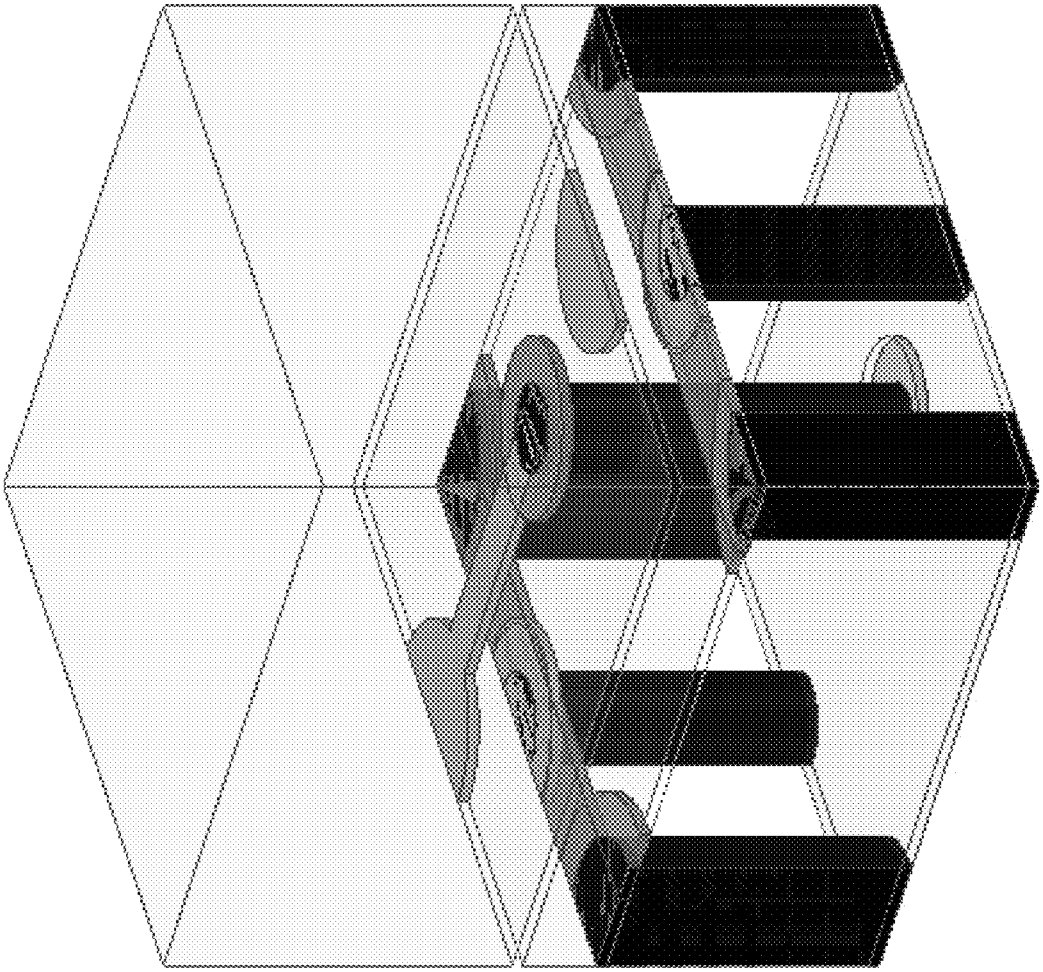
Figure 3E:
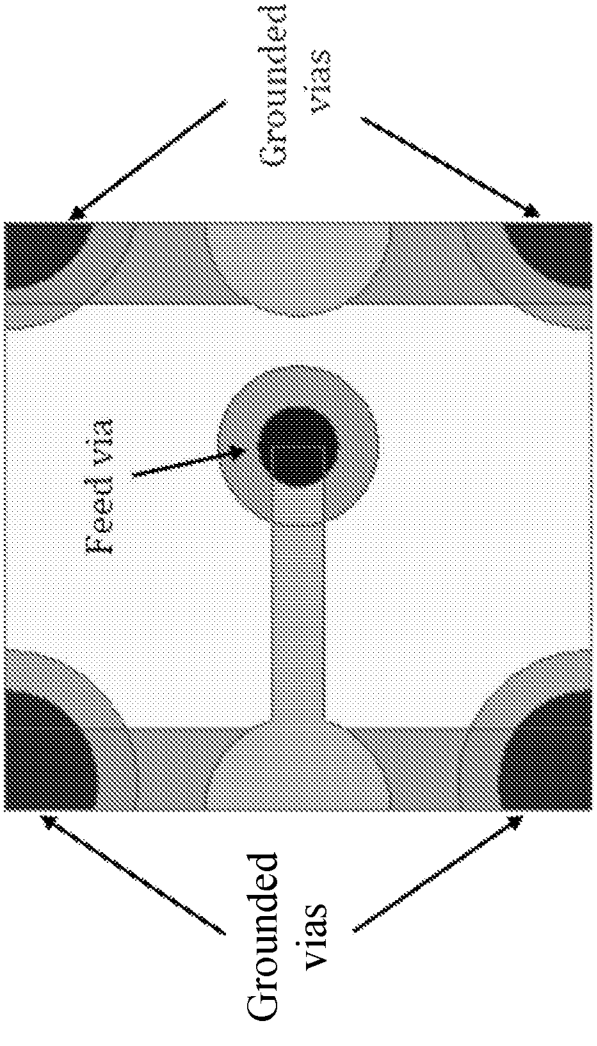
Figure 3F:
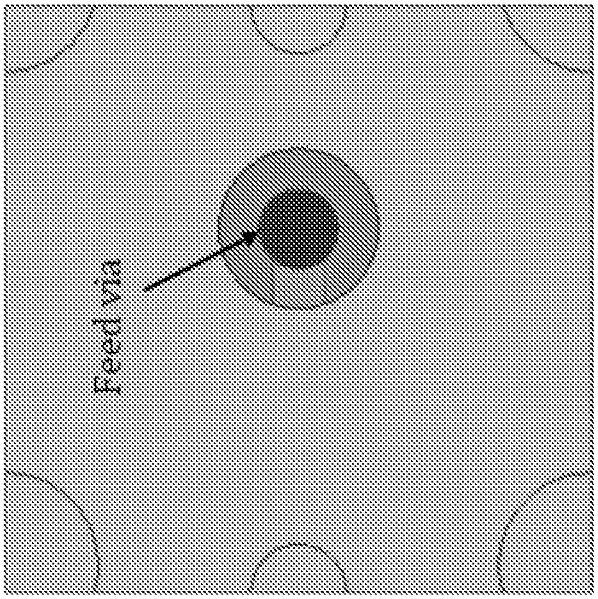
Figure 3H:
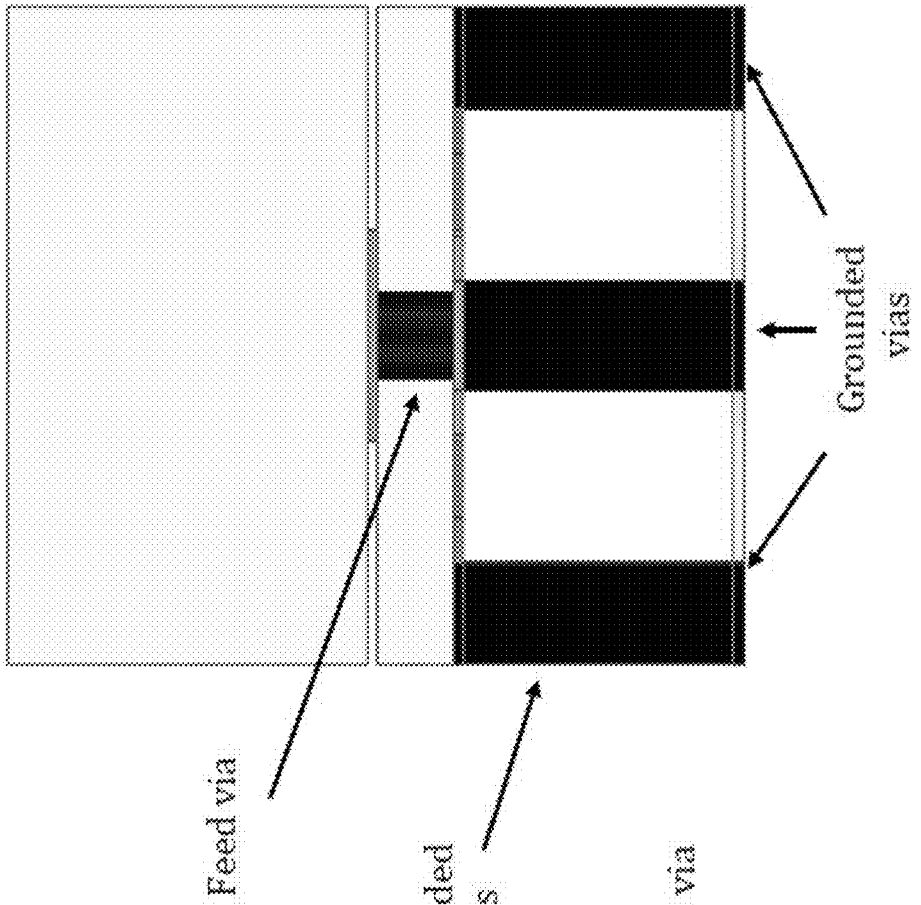
Figure 3G:
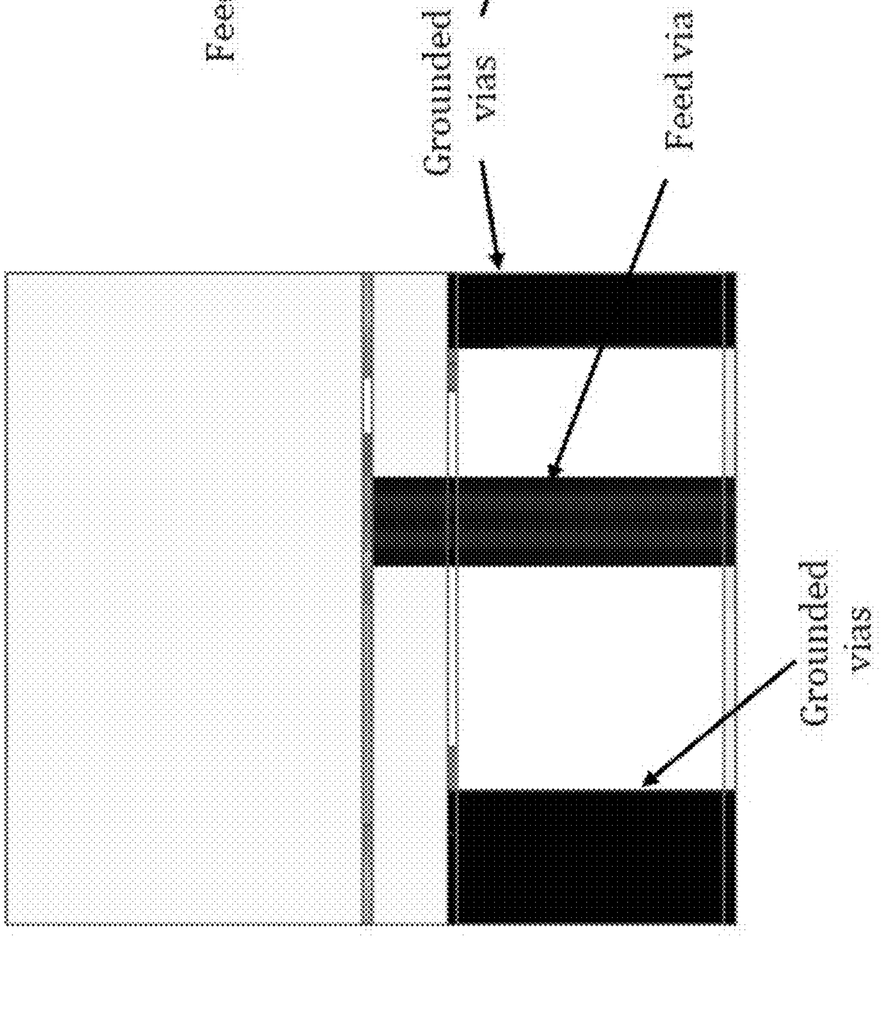
Figure 3I:
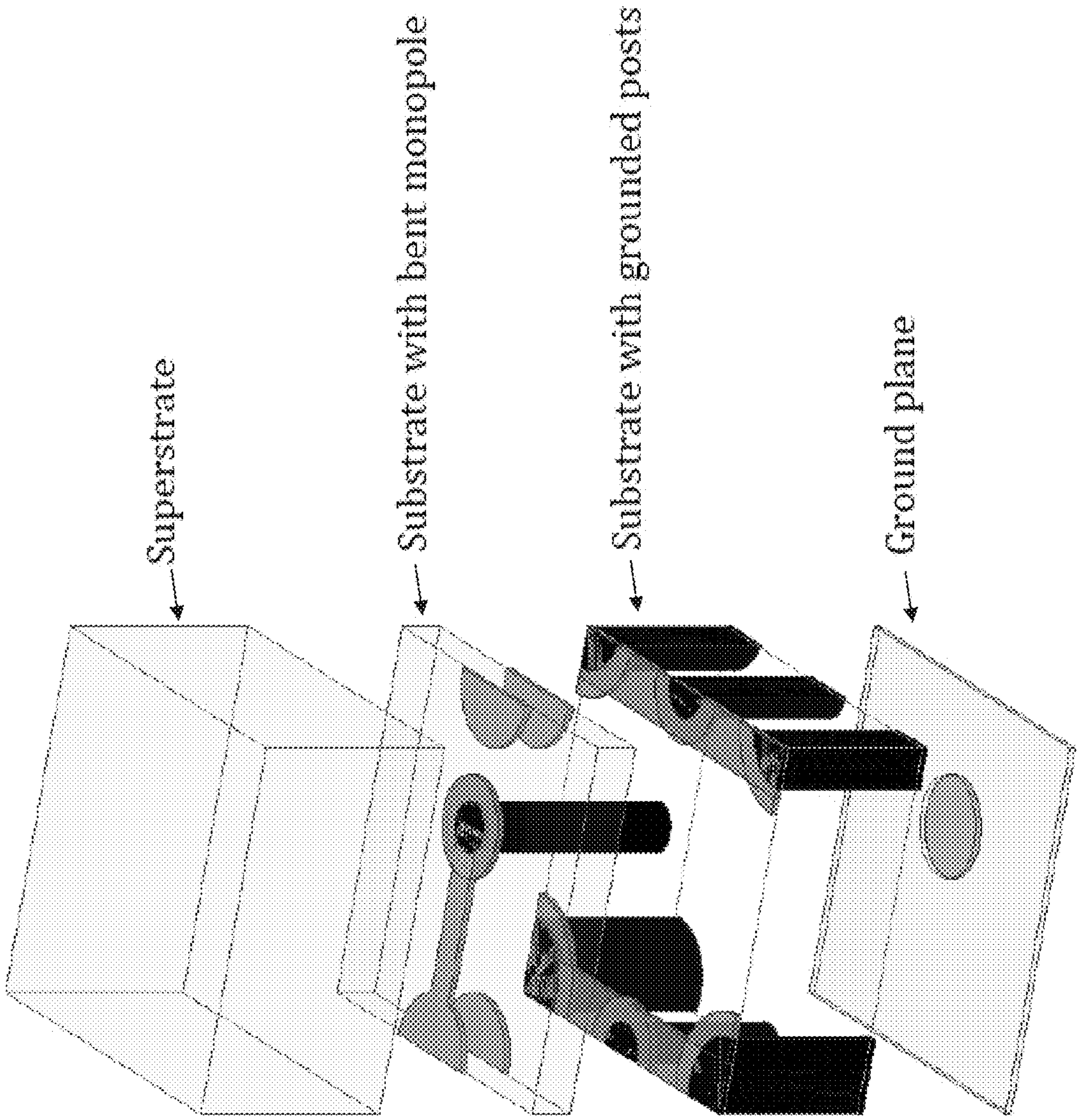

FIGS. 2(*a*)-2(*d*) show a stepwise procedure to eliminate the broadside null from the monopole radiation pattern. FIG. 2(*a*) shows a traditional monopole antenna, which is characterized by a broadside null in its radiation pattern, as shown in FIG. 2(*e*). The reason for this null is the strong vertical current of the monopole antenna (which can be referred to herein as the "monopole current"), which flows perpendicular to the ground plane. Therefore, in an effort to shift the direction of the monopole current, a microstrip line, parallel to the ground plane, is introduced on the top of the traditional monopole, and is extended towards one side of the monopole radiator. The result of this modification is the inverted L-shaped (or T-shaped) monopole shown in FIG. 2(*b*). However, it can be observed that even though this parallel-to-ground-plane current perturbs the radiation pattern of the monopole at some frequencies, it is not able to cancel the strong monopole currents in the entire band of interest (e.g., 60 GHZ-90 GHZ). Therefore, a grounded via can be added at the other end of the microstrip line, as shown in FIG. 2(*c*). The via can be capacitively coupled to the microstrip line. The introduction of this via is pivotal, as it creates a new current that flows perpendicular to the ground (which can be referred to herein as a "via current"), but in the opposite direction compared to the direction of the monopole current. This via current is strong enough to significantly reduce the effect of the monopole current on the broadside direction of its radiation pattern. Although this new via alleviates the problem with the null in the radiation pattern, it severely impacts the impedance matching performance of the antenna as can be seen in FIG. 2(*f*) (compare the "Step 2" curve with the "Step 3" curve). In order to solve this problem of matching performance, and further improve the radiation pattern in the broadside by suppressing entirely the monopole current, an additional grounded via adjacent to the monopole is added, as shown in FIG. 2(*d*). Referring to FIGS. 2(*f*) and 2(*g*), the inverted-L element (shown in FIG. 2(*d*)) has a broadside radiation pattern with significantly better impedance matching performance and no null in its broadside direction.

In many embodiments, an array does not include a balun, as arrays according to embodiments of the subject invention do not require any external balun(s). Due to the monopole nature of the inverted-L element, it can be fed with an unbalanced feed. When array elements are fed using an unbalanced feed, the net vertical currents on the radiator couple into a resonance, known as the common-mode resonance (CMR) (see also Holland and Vouvakis, "The banyan tree antenna array," IEEE Transactions on Antennas and Propagation, vol. 59, no. 11, pp. 4060-4070, 2011; and Holland and Vouvakis, "The planar ultrawideband modular antenna (puma) array," IEEE Transactions on Antennas and Propagation, vol. 60, no. 1, pp. 130-140, 2012; both of which are hereby incorporated by reference herein in their entireties). The CMR occurs when the path length, L, between grounded posts (vias) is equal to half a wavelength, i.e., $L=\lambda_{CMR}/2$ and can be calculated as, $$f_{CMR} = \frac{c_o}{2\sqrt{\epsilon_r} \times L} \quad (1)$$

Figure 4:
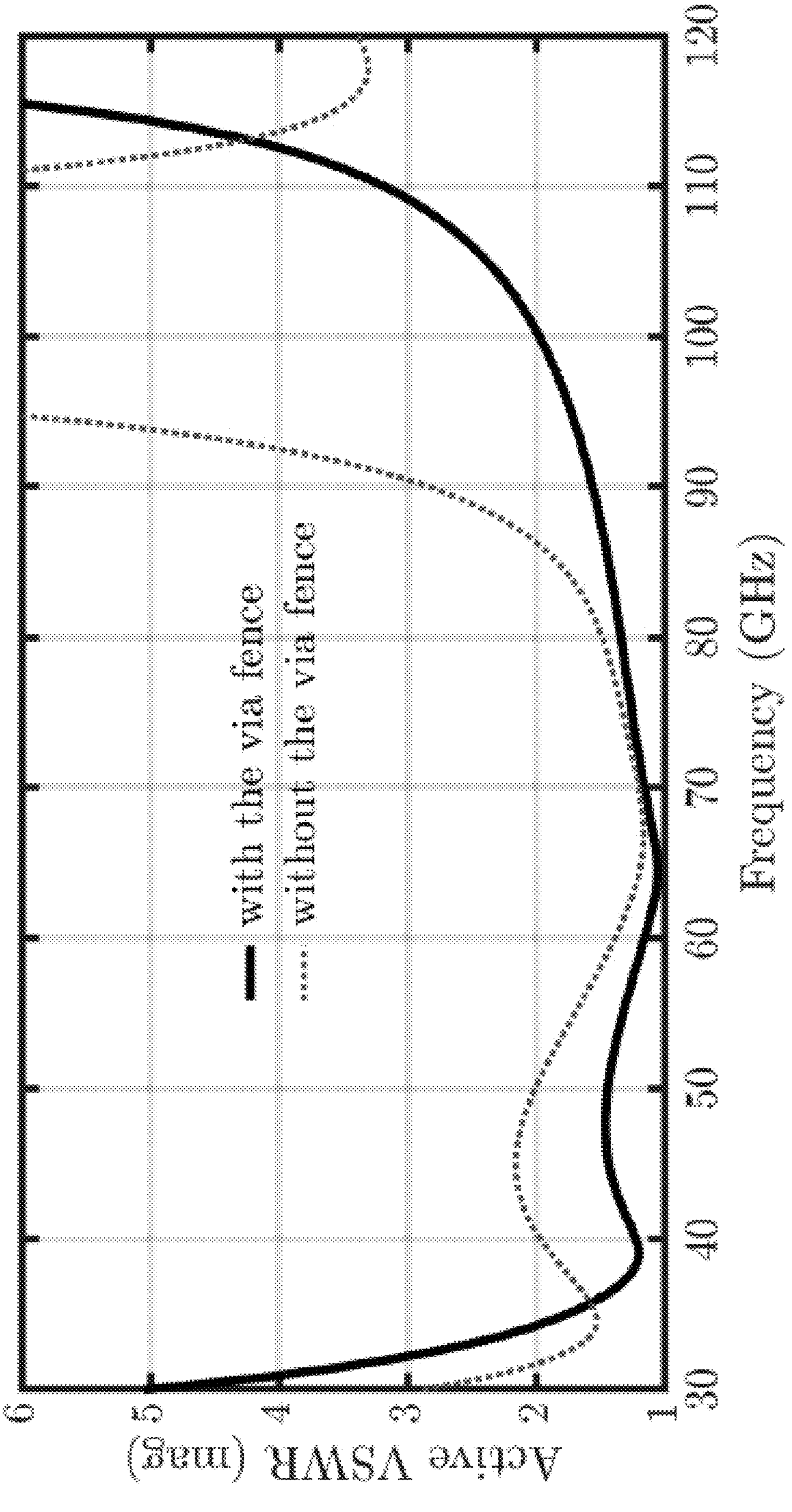
FIG. 4 shows a plot of active VSWR (magnitude (mag)) versus frequency (in GHz), showing simulated broadside VSWR, with and without the via fence. The (red) curve with the highest VSWR value at 50 GHz is for the case without the via fence; and the (black) curve with the lowest VSWR value at 50 GHz is for the case with the via fence.

The CMR can be conveniently removed by placing a shorting via between the two grounded posts; this via pushes the CMR outside the band towards higher frequencies. Due to this mechanism of operation, which has been extensively used in UWB arrays, an additional via-fence (comprising, e.g., one via and a microstrip line to connect subsequent vias) can be added to the unit cell of the final array (see, e.g., FIGS. 3(*a*) and 3(*b*)). The elimination of the CMR in the unit cell can be observed in FIG. 4, where it can be seen how the broadside VSWR changes with and without the use of the via-fence. FIG. 4 shows that the CMR is pushed towards higher frequencies after adding the via-fence. Notably, the slight deterioration of VSWR in the lower band edge in FIG. 4 is due to the generation of a loop-mode resonance (LMR) (see also Holland and Vouvakis, 2012, supra.).

In order to further improve the scanning bandwidth, a superstrate (e.g., a dielectric superstrate) can be included (see FIGS. 3(*a*), 3(*c*), 3(*d*), 3(*g*), 3(*h*), and 3(*i*)). The superstrate can be disposed on the antenna (e.g., on a substrate with the antenna) and can, in some embodiments, encapsulate the antenna.

Referring to FIGS. 3(*a*)-3(*i*), in an embodiment, a unit cell can include a ground plane, a first substrate disposed on the ground plane and comprising at least one grounded via, a second substrate disposed on the first substrate and comprising a bent antenna (e.g., a bent monopole antenna), and/or a superstrate disposed on the second substrate. The unit cell can further include a feed via connected to the bent antenna and extending to the level of the ground plane, which can include a hole through which the feed via passes. The grounded vias can connect the ground plane to ground contacts in the first and/or second substrates. The bent antenna can include a microstrip line that can include a central element (which can be, for example, circular or annular, though embodiments are not limited thereto), an arm element extending (e.g., in a lateral direction parallel to the ground plane) from the central element and electrically connected thereto, and a distal element at a far end of the arm element (from the central element) and electrically connected thereto. The distal element can have a, e.g., semicircular shape, though embodiments are not limited thereto. The feed via can be considered as part of the bent antenna, giving it the inverted-L shape. The unit cell can further include a via-fence of two vias disposed laterally (i.e., parallel to the ground plane) along opposing sides of a perimeter of the unit cell. The vias of the via fence can be higher than the upper surface of the grounded vias or can be at the same level thereof (and can either be electrically connected to the ground vias (and/or the ground plane) or not electrically connected to the ground vias or the ground plane).

Figure 7A:
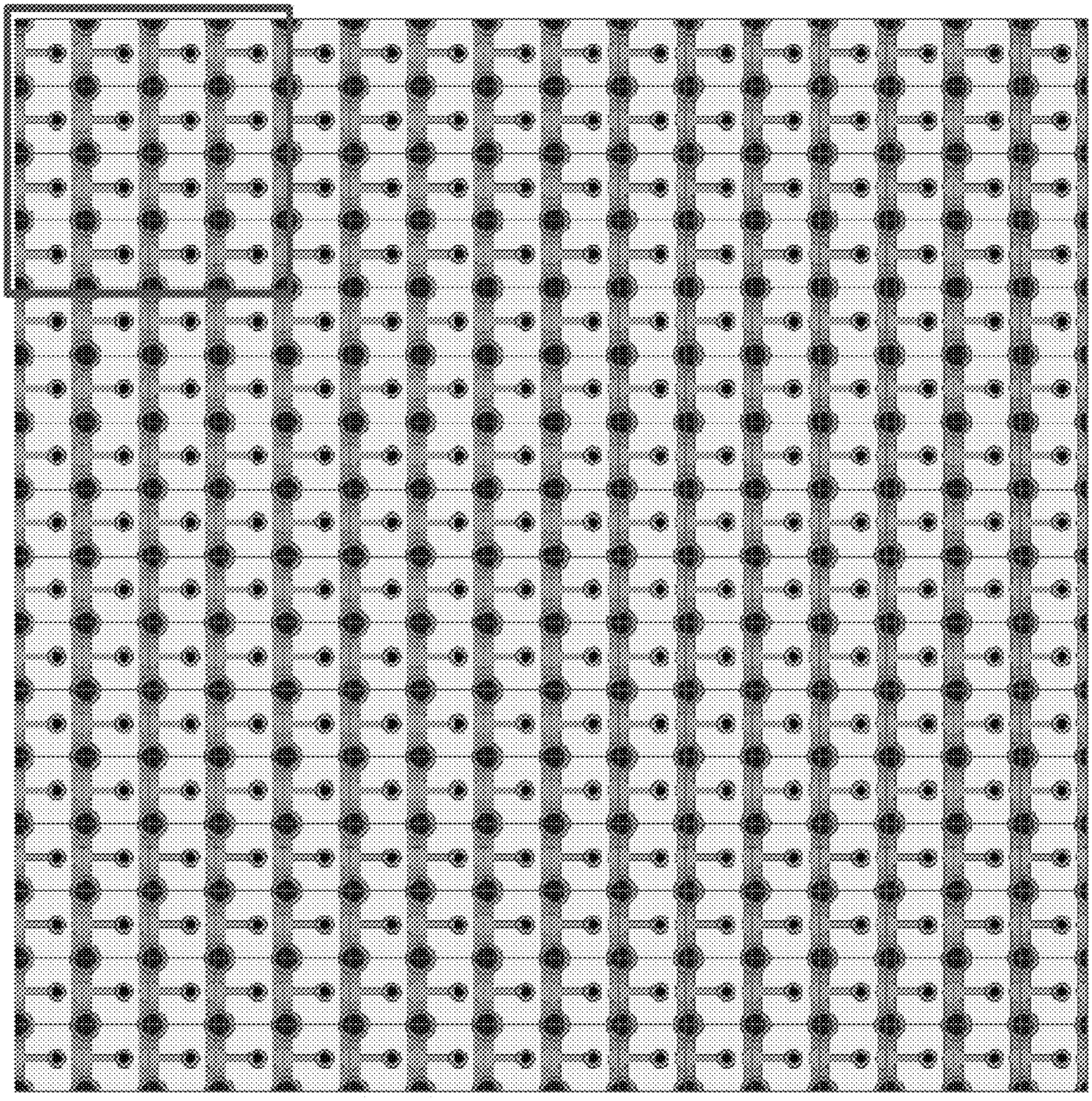
FIG. 7(*a*) shows a top view of a 16×16 FILE array, according to an embodiment of the subject invention. The upper-left 4×4 section has a solid-line square around it to show the section for the enlarged view of FIG. 7(*b*)
Figure 7B:
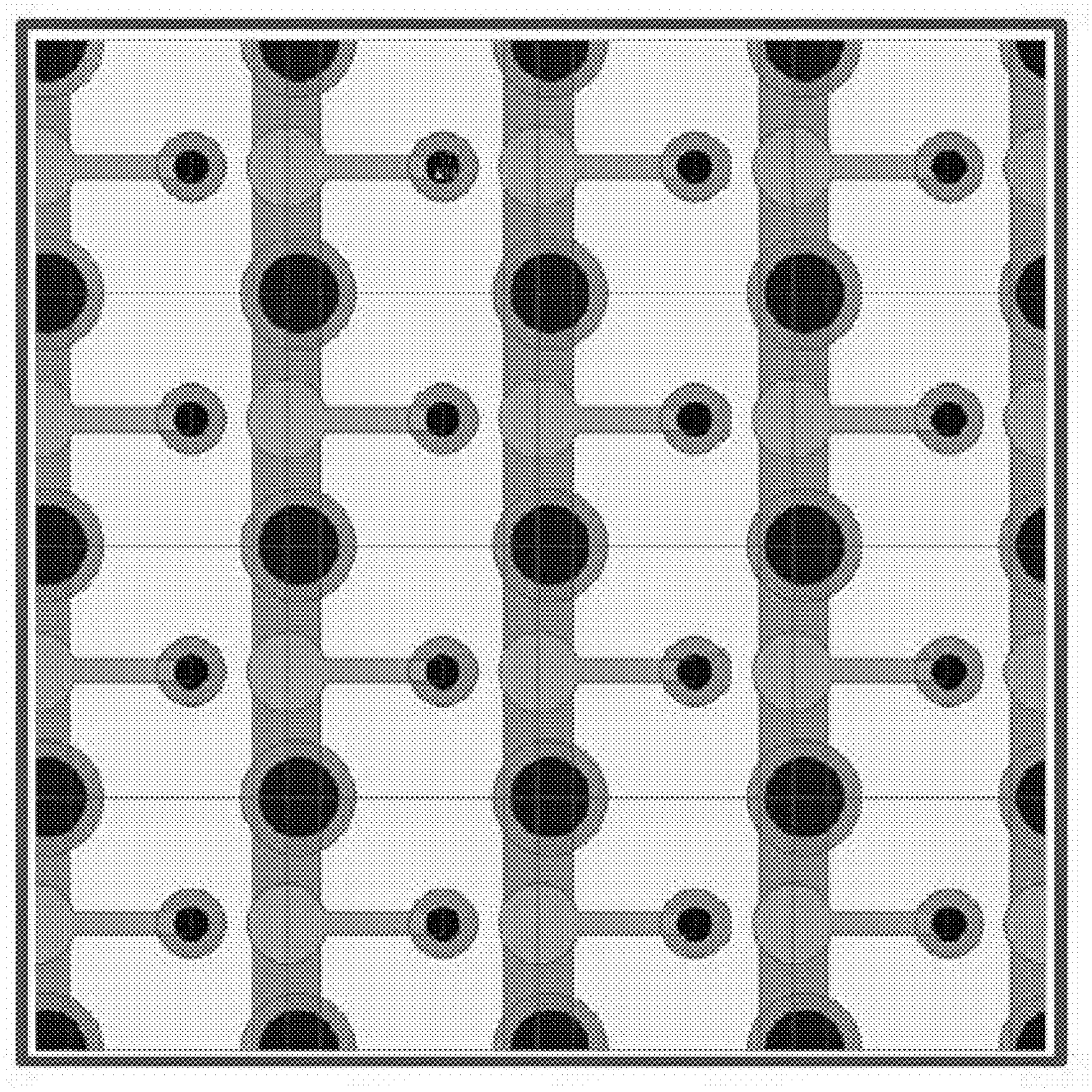
Figure 9:
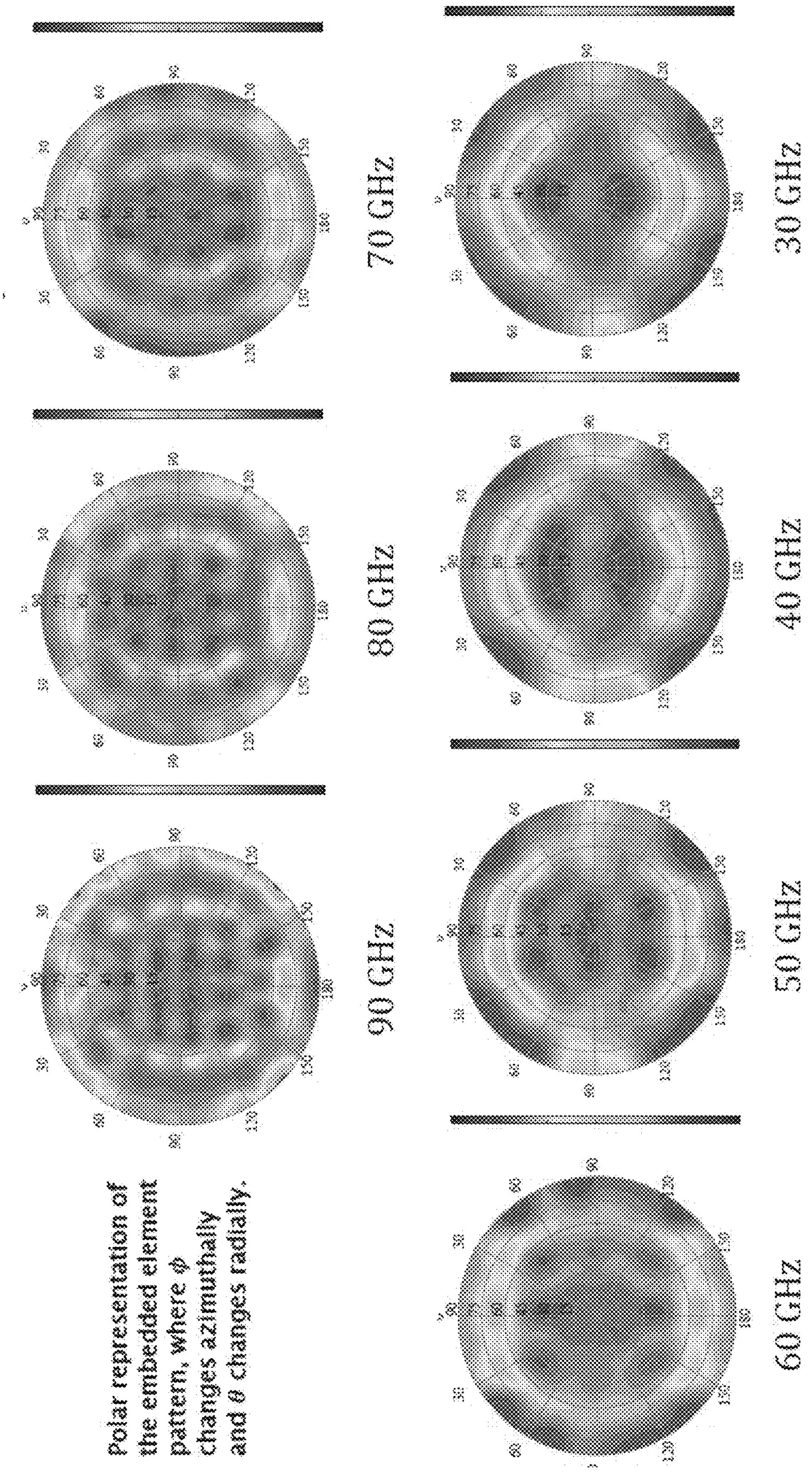
FIG. 9 shows embedded element patterns of the 16×16 FILE array at frequencies of 90 GHz, 80 GHz, 70 GHz, 60 GHz, 50 GHz, 40 GHz, and 30 GHz. The embedded element patterns of the 16×16 array show no broadside null for all $\varphi$ and $\theta\leq 45°$ throughout a frequency band of interest (30 GHz to 90 GHz).
Figure 10:
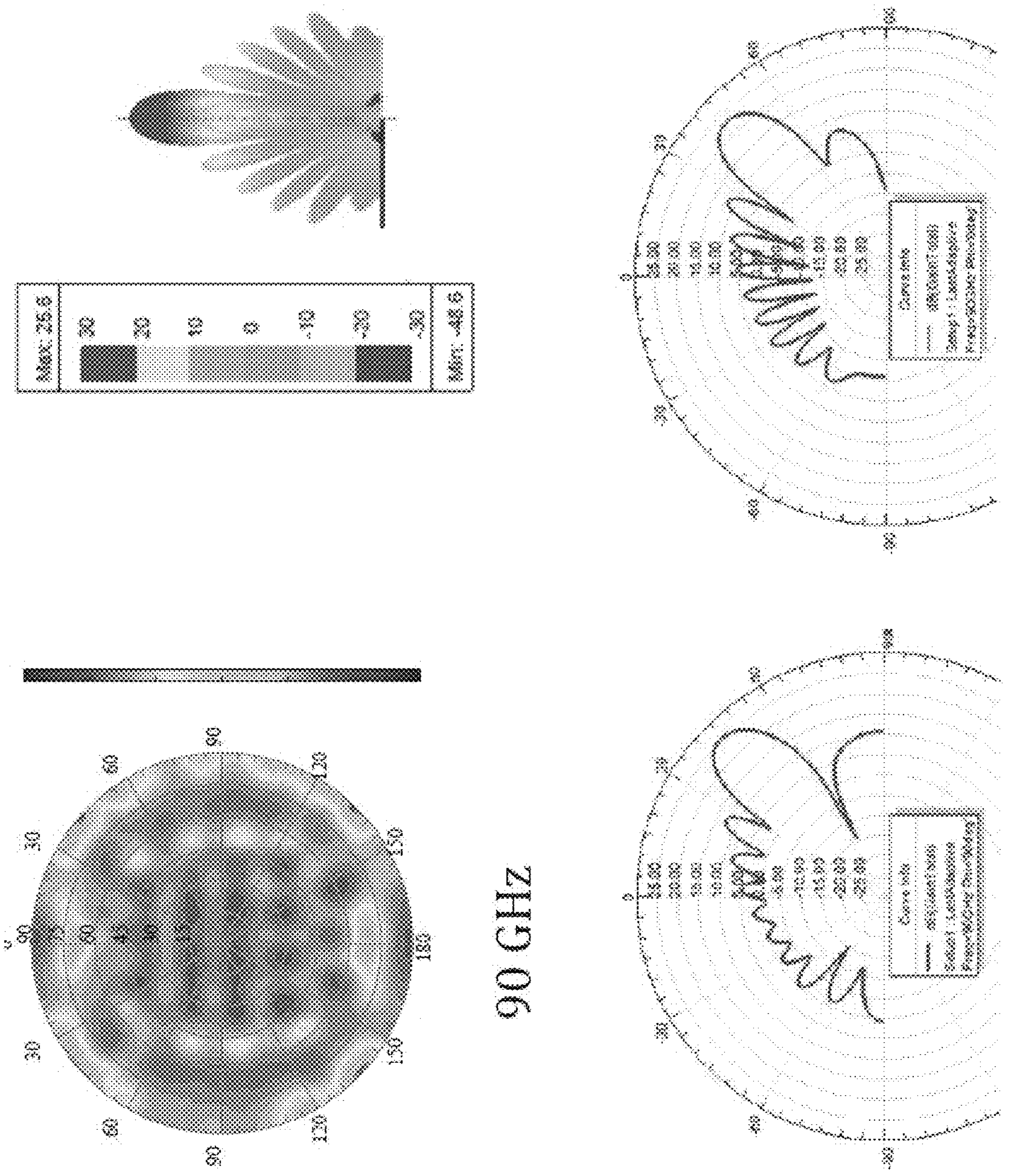
FIG. 10 shows scanning performance of the 16×16 FILM array. The 16×16 array is able to create a symmetric broadside beam, which shows that the null in the monopole radiation pattern is successfully eliminated. The 16×16 array is able to scan+/−45° in all principal planes, which verifies the good scanning performance of the array.

FIG. 7(*a*) shows a top view of a 16×16 array of inverted-L elements, and FIG. 7(*b*) shows an enlargement of the upper-left 4×4 section of the array of FIG. 7(*a*). FIG. 9 shows embedded element patterns of the 16×16 FILE array, and FIG. 10 shows scanning performance of the 16×16 FILE array.

Embodiments of the subject invention provide active planar tightly coupled arrays of antenna elements. The array can be fed by an unbalanced feed and does not require any external balun(s). The antenna can have a novel inverted-L shape (or I-shape) design comprising a through-hole feed via, perpendicularly placed to the ground plane of the array, and a microstrip line, connected to the feed via and extended towards one direction parallel to the ground plane. The bent antenna can be the primary radiator and can be fed through the via from underneath the ground plane (e.g., through a hole in the ground plane, as shown in FIG. 3(*e*)). A via-fence can be disposed extending in a direction perpendicularly (though they can be in the same plane) to the extension direction of the microstrip (e.g., the arm portion of the microstrip) of the bent antenna. The fence of vias can be grounded to the ground of the array and can be referred to as a grounded fence of vias (GFoV). The bent antenna can be capacitively coupled with the via-fence, and the capacitive coupling between the bent antenna and the via-fence can increase the frequency bandwidth and remove the null in the radiation pattern of a traditional monopole antenna. The via-fence can also help push both the common mode resonance and the detrimental loop mode resonance out of the band of operation. A dielectric superstrate can be disposed above the array to improve its scanning ability.

Embodiments of the subject invention provide TCAs (free, or mostly free, of broadside null in their radiation pattern). A TCA can comprise a plurality of antenna elements, each comprising: a first via (e.g., a first through-hole conductive via), which is disposed perpendicularly (or substantially perpendicularly) to a ground plane of the array, and goes through a first substrate; a conductive line (e.g., a microstrip line) connected to a top of the via and extending in a first direction parallel to the ground plane; a second via (e.g., a second through-hole conductive via) that is grounded on the ground plane and is capacitively coupled to the conductive line (e.g., to an end of the conductive line that is not connected to the top of the via); and a third via (e.g., a third through-hole conductive via) that is grounded on the ground plane. The first via (e.g., feed via) can operate as a traditional monopole element and can be directly fed from underneath (e.g., following the principles of standard unbalanced radio frequency (RF) feeding). The conductive line can be introduced to shift the direction of the current that runs on the monopole (i.e., the monopole current) towards the first direction parallel to the ground plane, and perturb the radiation pattern of the monopole (i.e., to remove the null from the broadside direction). The second via creates a new current that flows perpendicular to the ground plane (i.e., the via current), but in the opposite direction compared to the direction of the monopole current. The via current is strong enough to significantly reduce the effect of the monopole current on the broadside direction of its radiation pattern. The third via improves the matching performance of the antenna element, and further improves the radiation pattern characteristics in the broadside by helping to suppress entirely (or almost entirely) the monopole current.

Embodiments of the subject invention provide TCAs. The inverted-L element of the array is inspired by the traditional monopole antenna, and it minimizes design complexity compared to related art elements in tightly coupled arrays. Due to its monopole characteristics, the inverted-L element eliminates the need for additional vias and radiators, and it is fed using an unbalanced feed. In addition, a novel approach is used to eliminate the broadside null of the traditional monopole, making it appropriate for use in phased arrays that need to scan over the broadside. Embodiments also provide methods of fabricating an antenna element and/or array (sec, e.g., FIGS. 2(*a*)-2(*d*) and 7(*a*)), as well as methods of using the antenna elements and/or arrays according to their normal function.

The FILE array paves the way to realize UWB arrays in the higher mm Wave frequencies up to 100 GHz. The FILE array has a fully planar design, which can be fabricated using standard microwave fabrication techniques. The simulated results of the infinite array (see the examples) show that the array is capable of scanning up to θ=+/−45° in all principal planes, with a VSWR of less than 3, and finite array simulations closely tracked the ideal array performance. The FILE array is the first TCA that can operate at a frequency over 10 GHz, and it is a cost-effective solution for realizing UWB arrays in high mmWave (over 70 GHz) future platforms.

Embodiments of the subject invention can be used with, for example, 5G communications, 5G beyond communications, 6G communications, multi-functional communications, UWB communications, terrestrial communication systems, and/or satellite communication systems.

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Broadside VSWR was simulated for the unit cell shown in FIGS. 3(*a*)-3(*i*), both with and without the via-fence, with FIG. 4 showing the results. Referring to FIG. 4, the elimination of the CMR in the unit cell can be observed, where it can be seen how the broadside VSWR changes with and without the use of the via-fence. FIG. 4 shows that the CMR is pushed towards higher frequencies after adding the via-fence. The slight deterioration of VSWR in the lower band edge in FIG. 4 is due to the generation of an LMR.

Example 2

Figure 5:
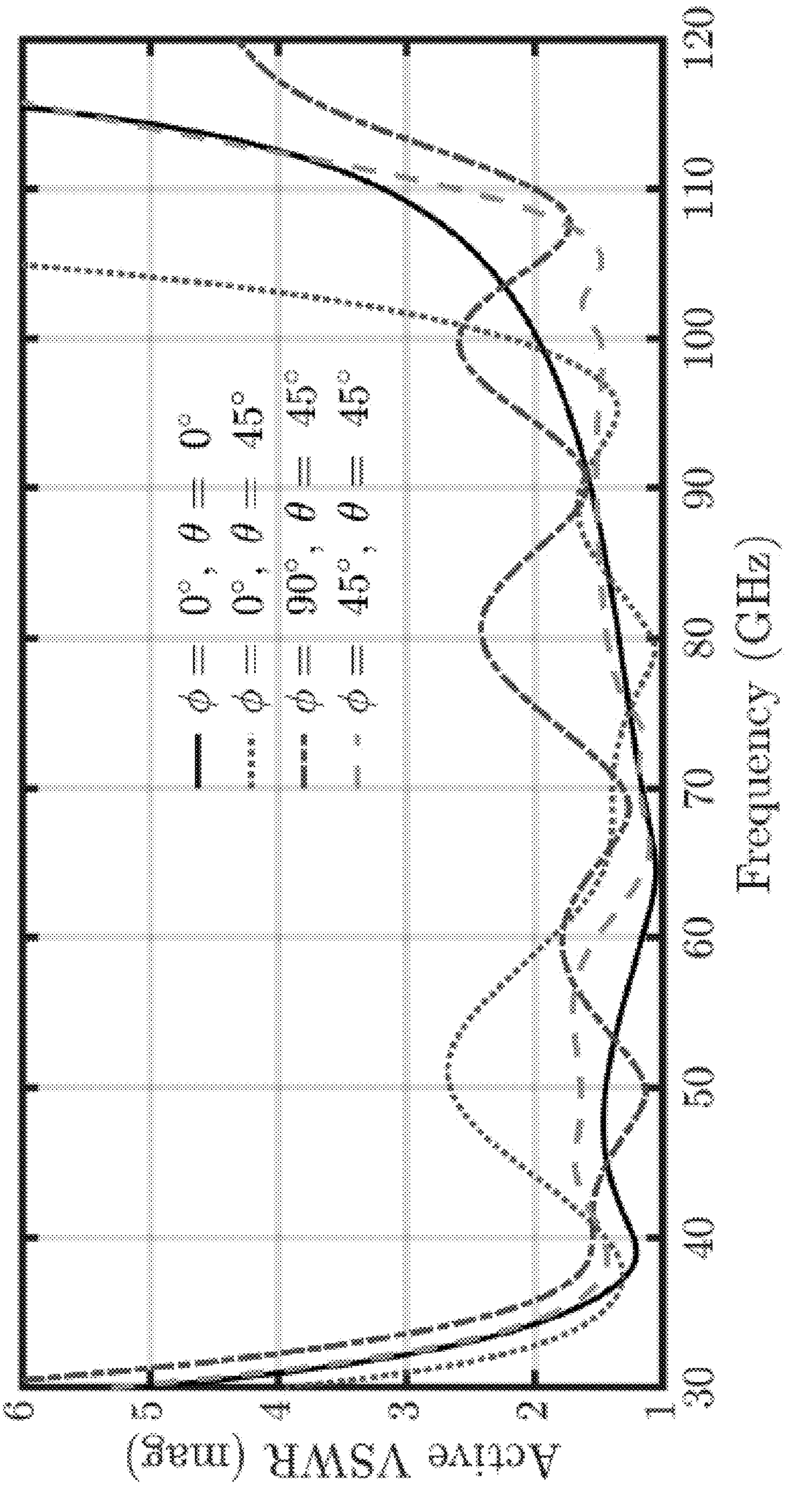
FIG. 5 shows a plot of active VSWR (mag) versus frequency (in GHz), showing simulated VSWR for an infinite FILM array, at different scan angles. The (red) curve with the highest VSWR value at 50 GHz is for $\varphi=0°$ and $\theta=45°$; the (green) curve with the second-highest VSWR value at 50 GHz is for $\varphi=45°$ and $\theta=45°$; the (black) curve with the third-highest VSWR value at 50 GHz is for $\varphi=0°$ and $\theta=0°$; and the (blue) curve with the lowest VSWR value at 50 GHz is for $\varphi=90°$ and $\theta=45°$.

Results were simulated for an infinite array of the unit cells shown in FIGS. 3(*a*)-3(*i*). The infinite array simulations were performed in ANSYS HFSS software. In order to further simplify the design, the two vias, one on the right and the other on the left of the monopole in FIG. 2(*d*), were converted to one single via in the array unit cell (as shown in FIGS. 3(*a*)-3(*i*)), due to symmetry. Referring to FIG. 5, the array maintained an active VSWR of less than 3 for the complete band of interest (33 GHz to 101 GHz), up to +/−45° scan angle, and for all principal planes.

Example 3

Figure 6A:
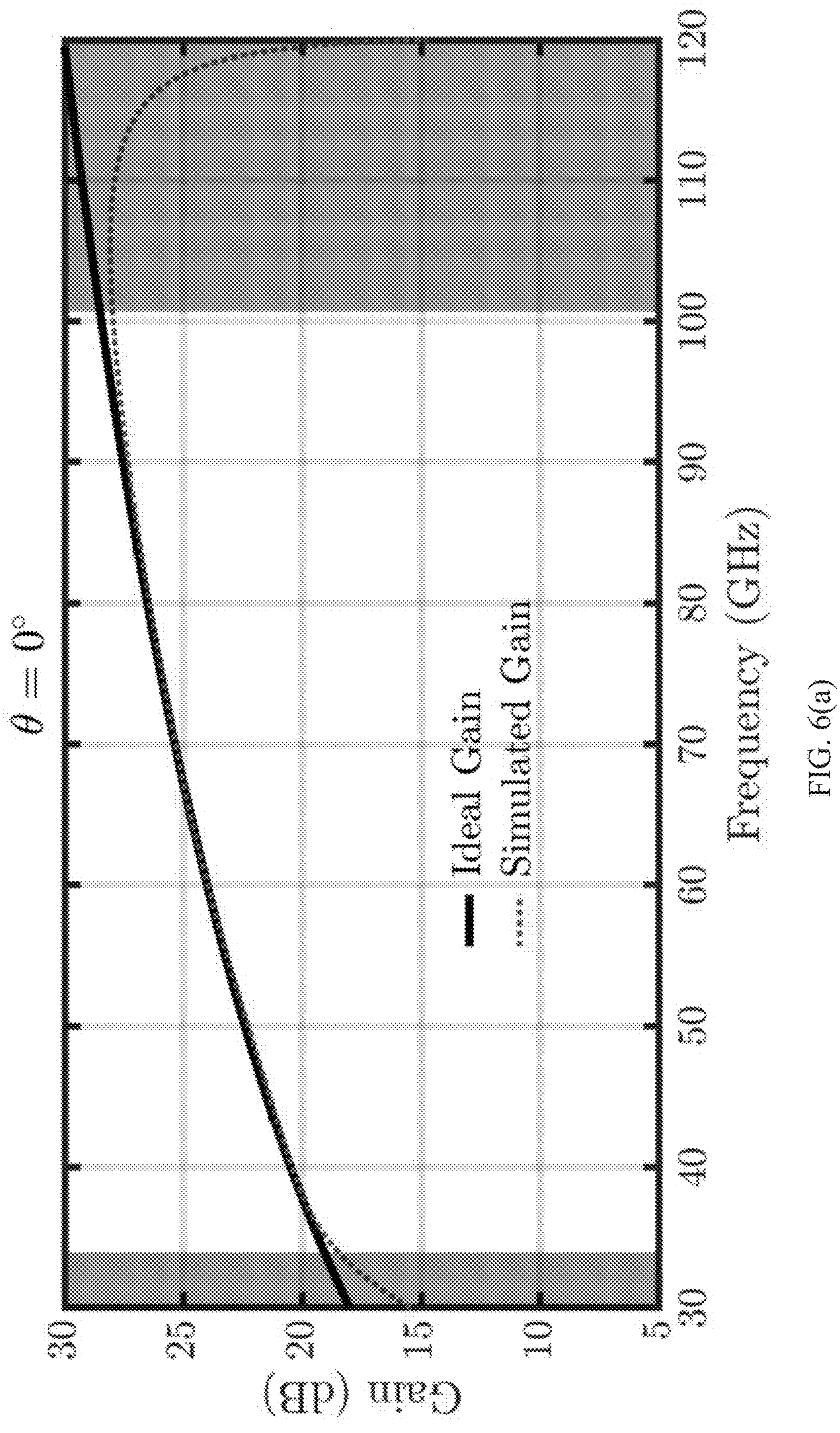
FIG. 6(*a*) shows a plot of gain (in decibels (dB)) versus frequency (in GHz) for a 16×16 FILM array, with $\theta=0°$. The unshaded region represents a desired frequency band of operation from 33 GHz to 101 GHz. The (black) curve with the highest gain value at 110 GHz is for the ideal gain; and the (red) curve with the lowest gain value at 110 GHz is for the simulated gain.
Figure 6B:
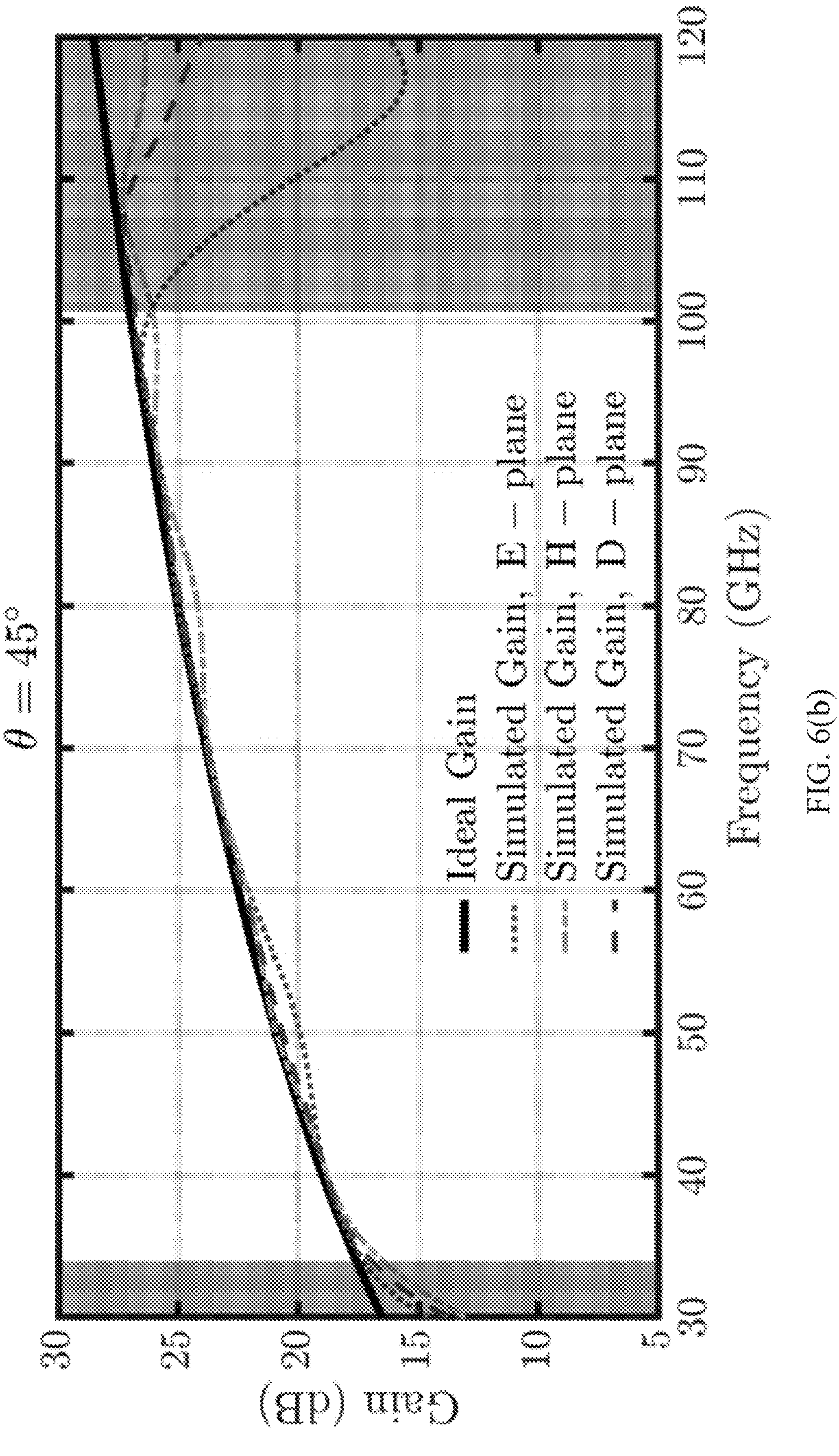

In order to verify the far-field performance of the FILE array, finite array simulations were performed. Specifically, a 16×16 array (as shown in FIG. 7(*a*), where each unit cell is as shown in FIGS. 3(*a*)-3(*i*)) was simulated, and the gain versus frequency curve is plotted for broadside (θ=0°) and θ=45° in FIGS. 6(*a*) and 6(*b*), respectively. Referring to FIGS. 6(*a*) and 6(*b*), the simulated gain closely tracks the ideal gain with slight degradation at some frequencies due to VSWR mismatch.

Example 4

Figure 8A:
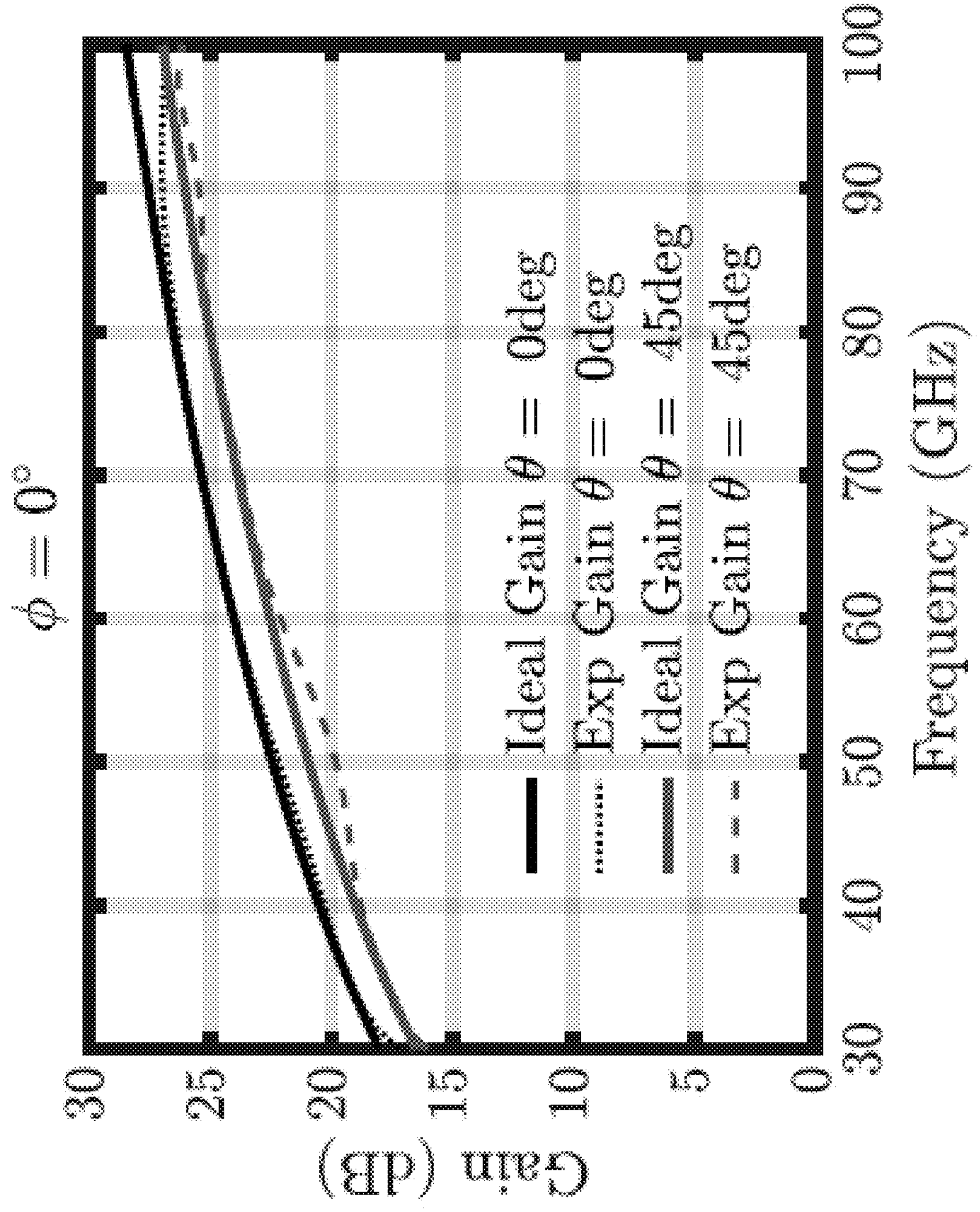
FIG. 8(*a*) shows a plot of gain (in dB) versus frequency (in GHz) for a 16×16 FILE array, with $\varphi=0°$. The (black) solid curve with the highest gain value at 90 GHz is for the ideal gain at $\theta=0°$; the (black) dashed curve with the second-highest gain value at 90 GHz is for the expected gain at $\theta=0°$; the (red) solid curve with the third-highest gain value at 90 GHz is for the ideal gain at $\theta=45°$; and the (red) dashed curve with the lowest gain value at 90 GHz is for the expected gain at $\theta=45°$.
Figure 8B:
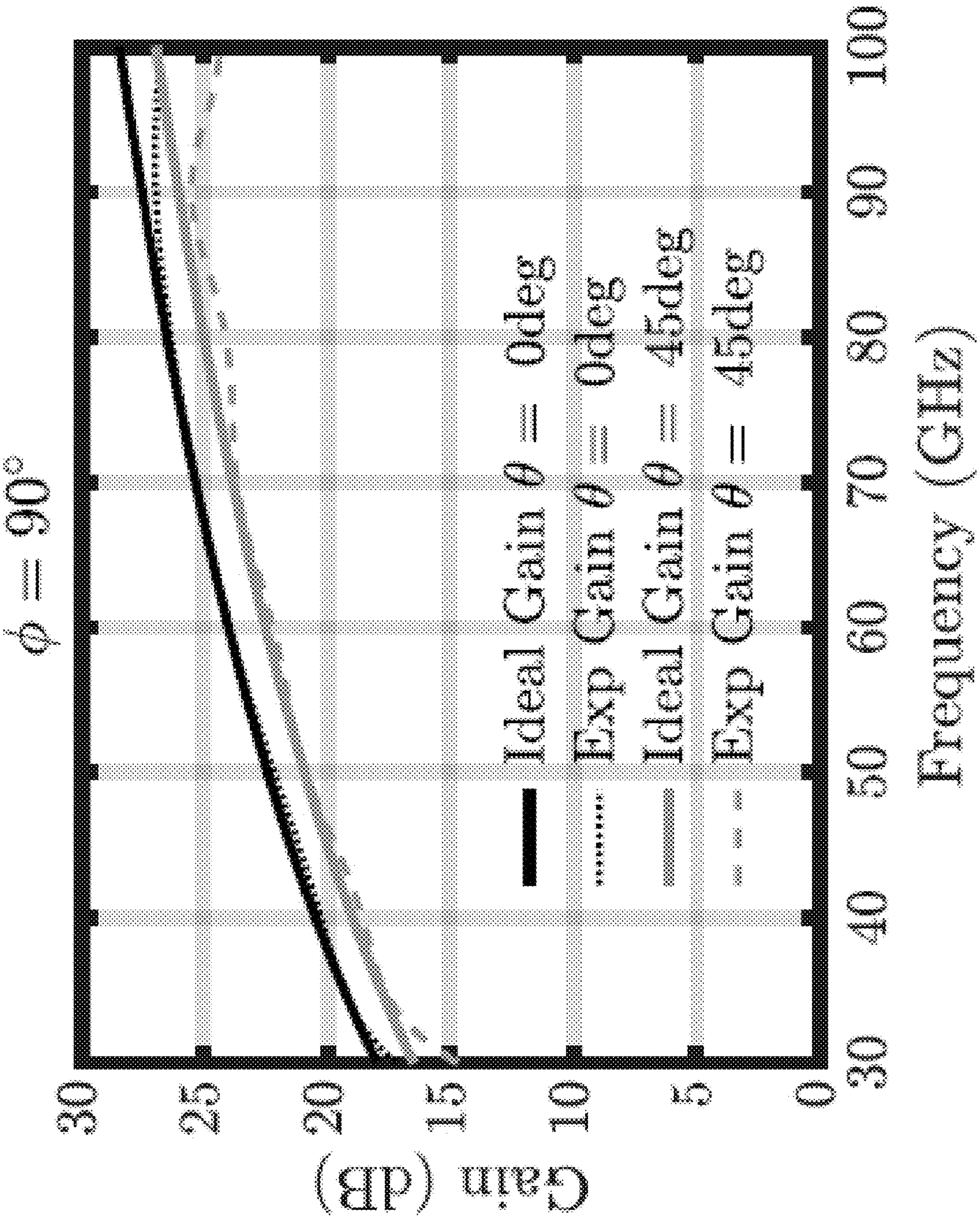
Figure 8C:
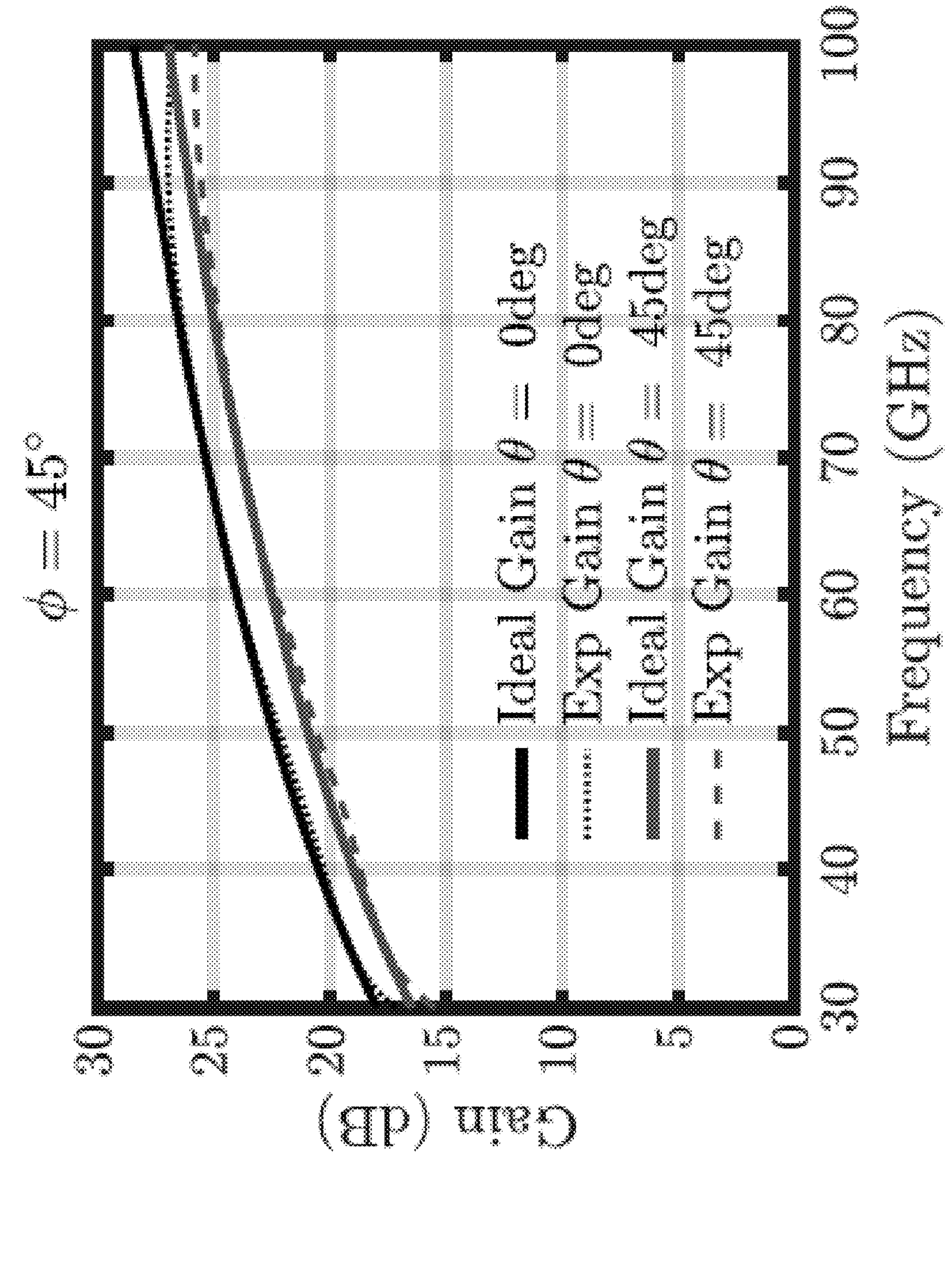

The gain for the 16×16 array (as shown in FIG. 7(*a*), where each unit cell is as shown in FIGS. 3(*a*)-3(*i*)) was simulated at different values of φ (φ=0°, φ=90°, and φ=45°) and for broadside (θ=0°) and θ=45° within each plot. The results for φ=0°, φ=90°, and φ=45° are shown in FIGS. 8(*a*), 8(*b*), and 8(*c*), respectively, with "expected gain" corresponding to the simulated gain.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An antenna element, comprising:

a ground plane;

a first grounded via disposed on the ground plane;

a second grounded via physically separated from the first grounded via and disposed on the ground plane;

a via fence electrically connected to the first grounded via and the second grounded via;

a bent monopole antenna comprising an antenna microstrip line extending parallel to the ground plane and a feed via electrically connected to the antenna microstrip line and extending down through the ground plane;

a first substrate disposed on the ground plane and through which the first grounded via, the second grounded via, and the feed via extend;

a second substrate disposed on the first substrate and through which the feed via extends; and a superstrate disposed on the second substrate, such that the second substrate is disposed between the first substrate and the superstrate, the via fence comprising a first fence microstrip line disposed parallel to the ground plane along a first side of a perimeter of the antenna element and a second fence microstrip line disposed parallel to the ground plane along a second side of the perimeter of the antenna element, the second side being opposite to the first side, the ground plane comprising a hole through which the feed via passes, the antenna microstrip line comprising a central element in physical contact with the feed via, a distal element disposed at the first side of the perimeter of the antenna element, and an arm element connecting the central element to the distal element, a cross-section of the central element taken in a first plane parallel to the ground plane having a circular or annular shape, a cross-section of the distal element taken in the first plane having a semicircular shape, and a cross-section of the arm element taken in the first plane having a rectangular shape, the superstrate being a dielectric superstrate, the antenna element being free from any balun and being free from any electrical connection to any balun, the first fence microstrip line being physically connected to the first grounded via, and the second fence microstrip line being physically connected to the second grounded via, the bent monopole antenna being the only antenna and the only radiator present in a unit cell of the antenna element, the first fence microstrip line extending in a direction parallel to that of the second fence microstrip line and perpendicular to that of the antenna microstrip line, the first grounded via being disposed at the first side of the perimeter of the antenna element, the first grounded via being capacitively coupled to the antenna microstrip line, the bent monopole antenna being a radiator, the antenna conductive line being disposed higher than the via fence, an upper surface of the first grounded via, and an upper surface of the second grounded via, such that a first distance from the ground plane to the antenna conductive line is greater than a second distance from the ground plane to the via fence, a third distance from the ground plane to the upper surface of the first grounded via, and a fourth distance from the ground plane to the upper surface of the second grounded via, and the first distance, the second distance, the third distance, and the fourth distance all being measured perpendicular to the ground plane.

2. An ultra-wideband (UWB) tightly coupled array (TCA), the UWB TCA comprising:

a plurality of unit cell antenna elements, each unit cell antenna element being an antenna element according to claim 1, the UWB TCA covering a frequency bandwidth in a range of from 1f to 3.06f, f being a lowest frequency of operation of the UWB TCA, and the UWB TCA being free from any balun and being free from any electrical connection to any balun.

* * * * *